US012802096B2

(12) United States Patent
Ecker et al.

(10) Patent No.: US 12,802,096 B2
(45) Date of Patent: Nov. 17, 2026

(54) INDUSTRY GIFT VOUCHER WITH FENCE NETWORK: SYSTEM AND METHOD

(71) Applicants: Matthew Ecker, Glen Gardner, NJ (US); David Tucker, Chatham, NJ (US)

(72) Inventors: Matthew Ecker, Glen Gardner, NJ (US); David Tucker, Chatham, NJ (US)

( * ) Notice: Subject to any disclaimer, the term of this patent is extended or adjusted under 35 U.S.C. 154(b) by 0 days.

(21) Appl. No.: 19/187,938

(22) Filed: Jul. 1, 2025

(65) Prior Publication Data

US 2025/0315858 A1 Oct. 9, 2025

Related U.S. Application Data

(63) Continuation of application No. 18/222,445, filed on Jul. 15, 2023, now abandoned.

(51) Int. Cl.

| | |
|---|---|
| ***G06Q 30/0226*** | (2023.01) |
| ***G06Q 20/10*** | (2012.01) |
| ***G06Q 20/12*** | (2012.01) |
| ***G06Q 20/40*** | (2012.01) |

(52) U.S. Cl.
CPC ......... *G06Q 30/0233* (2013.01); *G06Q 20/10* (2013.01); *G06Q 20/1235* (2013.01); *G06Q 20/40* (2013.01)

(58) Field of Classification Search
CPC ............... G06Q 30/0233; G06Q 20/10; G06Q 20/1235; G06Q 20/40; G06Q 20/405; G06Q 30/0207; G06Q 30/0235; G06Q 30/06
See application file for complete search history.

(56) References Cited

U.S. PATENT DOCUMENTS

| | | | | |
|---|---|---|---|---|
| 6,138,106 A * | 10/2000 | Walker | G06Q 20/28 705/14.1 |
| 9,224,141 B1 | 12/2015 | Lamba et al. | |
| 2008/0052164 A1* | 2/2008 | Abifaker | G06Q 30/0601 705/14.27 |

(Continued)

OTHER PUBLICATIONS

R. Bhattacharya, M. White and N. Beloff, “A blockchain based peer-to-peer framework for exchanging leftover foreign currency,” 2017 Computing Conference, London, UK, 2017, pp. 1431-1435, doi: 10.1109/SAI.2017.8252284. (Year: 2017).*

(Continued)

*Primary Examiner* — Sun M Li
(74) *Attorney, Agent, or Firm* — Kattina V Barsik, Esq.

(57) ABSTRACT

A method and a system is provided for secure transaction processing of an Industry Gift Voucher (IGV) in a blockchain network. The method includes receiving, by a processor of a blockchain node, a request to obtain ownership of the IGV from a terminal device associated with a first entity. The request includes data related to the IGV and unidentified data of the first entity. The processor identifies relevant data, transforms it into a concatenated data string, and generates a cryptographic hash value using a set of machine-readable instructions. The hash value, along with IGV and entity data, is stored on a distributed blockchain ledger. Ownership of the IGV is assigned to the first entity through execution of a smart contract that validates the hash and records updated ownership information on the ledger.

20 Claims, 21 Drawing Sheets

(56) References Cited

U.S. PATENT DOCUMENTS

| | | | | |
|---|---|---|---|---|
| 2012/0123924 | A1* | 5/2012 | Rose | G06Q 20/384 705/35 |
| 2016/0267474 | A1* | 9/2016 | Lingham | G06Q 20/363 |
| 2017/0278093 | A1 | 9/2017 | Emoff | |
| 2019/0164185 | A1 | 5/2019 | Givol et al. | |
| 2020/0111088 | A1* | 4/2020 | Lingham | G06Q 30/0238 |
| 2022/0327529 | A1* | 10/2022 | Williams | G06F 21/64 |
| 2023/0118213 | A1* | 4/2023 | Quigley | G06Q 20/40 705/65 |
| 2023/0385815 | A1* | 11/2023 | Jakobsson | G06Q 20/36 |
| 2023/0394469 | A1* | 12/2023 | Vijayan | G06Q 20/3672 |

OTHER PUBLICATIONS

Method for point of service 'automatic gift card redemption thank you' An IP.com Prior Art Database Technical Disclosure Authors et. al.: Disclosed Anonymously IP.com No. IPCOM000218179D IP.com Electronic Publication Date: May 25, 2012 (Year: 2012).*

A. Vigil, P. Pathak, S. Upadhyay, D. Singh and V. Garg, "Blockchain Over Transaction System," 2018 3rd International Conference on Communication and Electronics Systems (ICCES), Coimbatore, India, 2018, pp. 1111-1117, doi: 10.1109/CESYS.2018.8723962. (Year: 2018).*

M. Demir, A. A. Mashatan, O. Turetken and A. Ferworn, "Utility Blockchain for Transparent Disaster Recovery," 2018 IEEE Electrical Power and Energy Conference (EPEC), Toronto, ON, Canada, 2018, pp. 1-6, doi: 10.1109/EPEC2018.8598413. (Year: 2018).*

S. Sodagari, "Trends for Mobile IoT Crowdsourcing Privacy and Security in the Big Data Era," in IEEE Transactions on Technology and Society, vol. 3, No. 3, pp. 199-225, Sep. 2022, doi: 10.1109/TTS.2022.3191515 (Year: 2022).*

Ş. Bülbül and G. İnce, "Blockchain-based Framework for Customer Loyalty Program," 2018 3rd International Conference on Computer Science and Engineering (UBMK), Sarajevo, Bosnia and Herzegovina, 2018, pp. 342-346, doi: 10.1109/UBMK.2018.8566642. (Year: 2018).*

* cited by examiner

INDUSTRY GIFT VOUCHER WITH FENCE NETWORK: SYSTEM AND METHOD

CROSS REFERENCE TO RELATED APPLICATIONS

This application is a continuation-in-part application of U.S. patent application Ser. No. 18/222,445, filed Jul. 15, 2023, which claims priority benefit of U.S. Provisional Patent Application Ser. No. 63/391,158, filed Jul. 21, 2022. Each of the above-referenced applications is hereby incorporated herein by reference in its entirety.

TECHNICAL FIELD

The present invention relates to the field of secure digital transactions and, more particularly, to a system and a method facilitating secure transactions of Industry Gift Vouchers (IGVs) in a blockchain network.

BACKGROUND

Gift voucher systems have long been employed by industries as tools for consumer engagement, promotional campaigns, and loyalty programs. Traditionally, such vouchers have been issued in physical form—such as paper-based gift cards—or managed through centralized digital platforms. While these conventional approaches have facilitated basic voucher transactions, they are fraught with operational and security-related challenges.

In centralized systems, all records related to voucher issuance, ownership, and redemption are typically stored and managed by a single authority. This architecture makes the system vulnerable to issues such as unauthorized access, single points of failure, data tampering, and system downtime. Additionally, centralized databases often lack transparency and auditability, making it difficult to detect and prevent fraudulent activities.

Paper-based or manually tracked gift vouchers further exacerbate these problems. They are susceptible to physical damage, loss, counterfeiting, duplication, and misuse. Even in digital implementations, inadequate verification mechanisms may lead to unauthorized transfer or redemption of vouchers, reducing overall system reliability and user trust.

Moreover, traditional solutions typically do not support secure, rule-based circulation of vouchers within predefined ecosystems such as networks of affiliated businesses or enterprise alliances. There is often no enforceable mechanism to ensure that vouchers are used only within intended boundaries, or that terms such as expiration and usage conditions are consistently applied.

In light of these limitations, there exists a need for a secure, transparent, and tamper-resistant solution for managing the lifecycle of industry gift vouchers (IGVs) including their creation, transfer, and redemption. Additionally, there is a need to provide robust authentication, traceability, and enforcement of usage rules, while eliminating reliance on centralized infrastructure. The present invention seeks to address these technical issues.

SUMMARY OF INVENTION

Before the present method and the system for secure transaction processing of an Industry Gift Voucher (IGV) in a blockchain network is described, it is to be understood that this application is not limited to the particular system, and methodologies described, as there can be multiple possible embodiments that are not expressly illustrated in the present disclosure. It is also to be understood that the terminology used in the description is to describe the particular implementations or versions or embodiments only, and is not intended to limit the scope of the present application.

This summary is provided to introduce aspects related to the method and the system. This summary is not intended to identify essential features of the claimed subject matter nor is it intended for use in determining or limiting the scope of the claimed subject matter.

In one embodiment, a method for secure transaction processing of an Industry Gift Voucher (IGV) in a blockchain network is described. The method for secure transaction processing of the Industry Gift Voucher (IGV) in the blockchain network comprises receiving, via a processor of a blockchain node of a plurality of blockchain nodes, a request for obtaining ownership of the IGV from a terminal device associated to a first entity of a plurality of entities, wherein the request includes unidentified data related to the first entity and data related to the IGV. Further, the method comprises identifying, via the processor, at least one of a set of attributes of the IGV from the data related to the IGV, and the unidentified data related to the first entity, based on the receiving the request for obtaining the ownership of the IGV. Further, the method comprises transforming, via the processor, at least one of data related to the set of attributes of the IGV and identified data related to the first entity to a first concatenated data string, based on the identifying the at least one of the set of attributes of the IGV and the unidentified data related to the first entity. Further, the method comprises generating, via the processor, a first cryptographic hash value for the IGV, based on the first concatenated data string and execution of at least a set of machine-readable instructions, wherein the first cryptographic hash value, the data related to the set of attributes of the IGV, and the identified data related to the first entity are stored on a blockchain ledger that is distributed over the plurality of blockchain nodes. Further, the method comprises assigning, via the processor, the ownership of the IGV to the first entity, based on the generating the first cryptographic hash value and executing a first smart contract of a plurality of smart contracts, wherein the plurality of smart contracts is stored on the blockchain ledger, the first smart contract, when executed, validates authenticity of the first cryptographic hash value by acquiring the first cryptographic hash value from the blockchain ledger and comparing, subsequently, the first cryptographic hash value with at least one of the data related to the set of attributes of the IGV and the identified data related to the first entity, the first smart contract, in real-time, records ownership information of the IGV on the blockchain ledger after the assigning the ownership of the IGV to the first entity, and the ownership information of the IGV recorded on the blockchain ledger is immutable and verified through the first cryptographic hash value.

In another embodiment, a system for secure transaction processing of an Industry Gift Voucher (IGV) in a blockchain network is described. The system for secure transaction processing of the Industry Gift Voucher (IGV) in the blockchain network comprises a plurality of blockchain nodes, wherein each blockchain node of the plurality of blockchain nodes comprises a processor. The processor is configured to receive a request for obtaining ownership of the IGV from a terminal device associated to a first entity of a plurality of entities, wherein the request includes unidentified data related to the first entity and data related to the IGV, and the terminal device is communicatively coupled to the processor. Further, the processor is configured to identify at least one of a set of attributes of the IGV from the data related to the IGV, and the unidentified data related to the first entity, based on receipt of the request for obtaining the ownership of the IGV. Further, the processor is configured to transform at least one of data related to the set of attributes of the IGV and identified data related to the first entity to a first concatenated data string, based on identification of the at least one of the set of attributes of the IGV and the unidentified data related to the first entity. Further, the processor is configured to generate a first cryptographic hash value for the IGV, based on the first concatenated data string and execution of at least a set of machine-readable instructions, wherein the first cryptographic hash value, the data related to the set of attributes of the IGV, and the identified data related to the first entity are stored on a blockchain ledger that is distributed over the plurality of blockchain nodes. Further, the processor is configured to assign the ownership of the IGV to the first entity, based on generation of the first cryptographic hash value and execution of a first smart contract of a plurality of smart contracts, wherein the plurality of smart contracts is stored on the blockchain ledger, the first smart contract, when executed, validates authenticity of the first cryptographic hash value by acquiring the first cryptographic hash value from the blockchain ledger and comparing, subsequently, the first cryptographic hash value with the at least one of the data related to the set of attributes of the IGV and the identified data related to the first entity, the first smart contract, in real-time, records ownership information of the IGV on the blockchain ledger after assignment of the ownership of the IGV to the first entity, and the ownership information of the IGV recorded on the blockchain ledger is immutable and verified through the first cryptographic hash value.

In another embodiment, a non-transitory computer readable medium for secure transaction processing of an Industry Gift Voucher (IGV) in a blockchain network is described. The non-transitory computer readable medium having computer-executable instructions stored therein. The non-transitory computer readable medium, when executed by a processor of a blockchain node of a plurality of blockchain nodes, cause the processor to execute operations. The operations comprise receiving a request for obtaining ownership of the IGV from a terminal device associated to a first entity of a plurality of entities, wherein the request includes unidentified data related to the first entity and data related to the IGV. Further, the operations comprise identifying at least one of a set of attributes of the IGV from the data related to the IGV, and the unidentified data related to the first entity, based on the receiving the request for obtaining the ownership of the IGV. Further, the operations comprise transforming at least one of data related to the set of attributes of the IGV and identified data related to the first entity to a first concatenated data string, based on the identifying the at least one of the set of attributes of the IGV and the unidentified data related to the first entity. Further, the operations comprise generating a first cryptographic hash value for the IGV, based on the first concatenated data string and execution of at least a set of machine-readable instructions, wherein the first cryptographic hash value, the data related to the set of attributes of the IGV, and the identified data related to the first entity are stored on a blockchain ledger that is distributed over the plurality of blockchain nodes. Further, the operations comprises assigning the ownership of the IGV to the first entity, based on the generating the first cryptographic hash value and executing a first smart contract of a plurality of smart contracts, wherein the plurality of smart contracts is stored on the blockchain ledger, the first smart contract, when executed, validates authenticity of the first cryptographic hash value by acquiring the first cryptographic hash value from the blockchain ledger and comparing, subsequently, the first cryptographic hash value with the at least one of the data related to the set of attributes of the IGV and the identified data related to the first entity, the first smart contract, in real-time, records ownership information of the IGV on the blockchain ledger after the assigning the ownership of the IGV to the first entity, and the ownership information of the IGV recorded on the blockchain ledger is immutable and verified through the first cryptographic hash value.

In another embodiment, a method for Industry Gift Voucher (IGV) management in fence networks is disclosed. The method may include generating a cryptographic hash (unique alphanumeric key) for each IGV using blockchain algorithms. This hash serves as a unique identifier that ensures the integrity and authenticity of the voucher. Further, the method may include storing IGV lifecycle events—creation, ownership transfer, and redemption—on a distributed ledger. This ledger records every transaction in an immutable format, providing an auditable trail for compliance and transparency. Further, the method may include automating ownership validation and transfer through blockchain-enabled smart contracts.

These contracts validate the credentials of the involved parties and execute the transfer without manual intervention. Further, the method may include verifying fence link eligibility via digital credentials validated by the blockchain. Enterprises must submit and validate industry-specific licenses or certifications, which are then recorded on the ledger. Further, the method may include maintaining an immutable audit trail of all IGV-related transactions, ensuring transparency and security. The system timestamps each transaction to prevent double-spending or unauthorized alterations. Further, the method may include automatically validating numerical keys and timestamps during IGV redemption and ownership transfer to ensure authenticity and prevent fraud. The blockchain verifies that the voucher is unexpired and has not been previously redeemed. The methodology guarantees data integrity and reduces the risk of tampering or fraud by leveraging the blockchain's decentralized architecture. It also introduces operational efficiency by automating complex processes, such as user verification, transaction validation, credential checks, and buyback mechanisms, which were previously manual and error-prone.

In another embodiment, a method for Industry Gift Voucher (IGV) management in fence networks is disclosed. The method may include determining a base value, a unique alphanumeric key, and an expiration date to create an IGV. The method may further include assigning ownership of the IGV to a first user upon receiving a purchase request from the first user and required information of the first user. The method may further include transferring the ownership of the IGV to a second user upon receiving a gift request from the first user and required information of the second user. The method may further include facilitating redemption of the IGV to the second user to utilize the IGV through at least one enterprise of a plurality of enterprises associated with one of the fence networks. It should be noted that the IGV may be circulated within the fence networks.

In another embodiment, a system for Industry Gift Voucher (IGV) management in fence networks is disclosed. The system may include a processor and a memory communicatively coupled to the processor. The memory may store processor-executable instructions, which on execution, may further cause the processor to determine a base value, a unique alphanumeric key, and an expiration date to create an IGV. The processor-executable instructions, on execution, may further cause the processor to assign ownership of the IGV to a first user upon receiving a purchase request from the first user and required information of the first user. The processor-executable instructions, on execution, may further cause the processor to transfer the ownership of the IGV to a second user upon receiving a gift request from the first user and required information of the second user. The processor-executable instructions, on execution, may further cause the processor to facilitate redemption of the IGV to the second user to utilize the IGV through at least one enterprise of a plurality of enterprises associated with one of the fence networks. It should be noted that the IGV may be circulated within fence networks.

In yet another embodiment, a non-transitory computer-readable medium storing computer-executable instructions for Industry Gift Voucher (IGV) management in fence networks is disclosed. The stored instructions, when executed by a processor, may cause the processor to perform operations including determining a base value, a unique alphanumeric key, and an expiration date to create an IGV. The operations may further include assigning ownership of the IGV to a first user upon receiving a purchase request from the first user and required information of the first user. The operations may further include transferring the ownership of the IGV to a second user upon receiving a gift request from the first user and required information of the second user. The operations may further include facilitating redemption of the IGV to the second user to utilize the IGV through at least one enterprise of a plurality of enterprises associated with one of the fence networks. It should be noted that the IGV may be circulated within fence networks.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
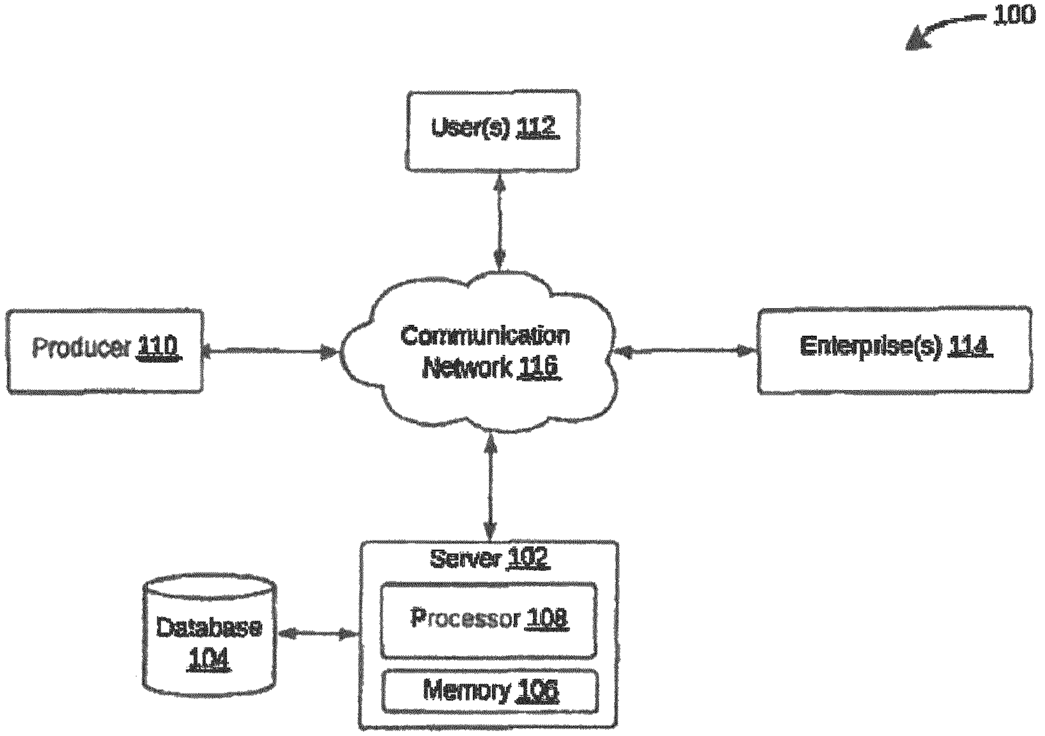
FIG. 1 is a block diagram illustrating a system for Industry Gift Voucher (IGV) management in fence networks, in accordance with an embodiment.

Referring now to FIG. 1, a block diagram of a system 100 for IGV management in fence networks is illustrated, in accordance with an embodiment. The system 100 may be capable of creating and distributing digital tokens (e.g., IGVs) that may be traded between individuals and businesses. These IGVs may be used to obtain discounts on goods and services within a specific network (e.g., fence network) of participating businesses and organizations.

The system 100 may include a server 102, a producer 110, users 112, and enterprises 114. The server 102, the producer 110, the users 112, and the enterprises 114 are configured to communicate with each other via a communication network 116. In other words, the communication network 116 enables seamless communication and data exchange between the server 102, the producer 110, the users 112, and the enterprises 114. Examples of the communication network 116 may include, but are not limited to, a wireless fidelity (Wi-Fi) network, a light fidelity (Li-Fi) network, a local area network (LAN), a wide area network (WAN), a metropolitan area network (MAN), a satellite network, an Internet, a fiber optic network, a coaxial cable network, an infrared (IR) network, a radio frequency (RF) network, and a combination thereof.

The producer 110 may be an entity responsible for managing the IGV. It oversees a creation, distribution, and redemption of IGVs. The producer 110 may set up the rules and parameters for the IGVs, including face values, expiration dates, and incentives for buyback. The producer 110 may also interfaces with the server 102 and database 104 to facilitate various transactions and processes within the system 100.

The users 112 may be individuals that may include a first user (for example, a gifter) and a second user (for example, a recipient) who purchase or receive IGVs, respectively. The users 112 may interact with the system 100 through a communication network 116 and the server 102 to perform actions such as purchasing, gifting, redeeming, or transferring IGVs. The IGVs may be fully funded in advance by the gifter and may be redeemed at the point of sale by transferring ownership to a redeeming retailer.

In some embodiments, the system 100 may allow the recipient to choose how the recipient wants to use the IGV. For example, the recipient may either redeem it directly with the producer 110 for goods or services, or they may donate it to a charity or nonprofit organization related to the industry. The recipient may also transfer the IGV to another recipient within the fence network.

The enterprises 114 may be an organisation, a business, a non-profit organisation, a producer's site, a retailer, distributors, suppliers, or an affiliated organisation. The enterprises 114 may interact with the system 100 to accept IGVs as a payment, offer goods or services for redemption, or participate in the buyback process.

In some embodiments, the enterprises 114 may benefit from increased visibility within the fence network and may have an option to discount a sale up to a value of the IGV. In some embodiments, the enterprises 114 may sell the IGV back to the producer 110, earning additional profit.

The server 102 may be a centralized server or a group of decentralized servers that may be responsible to manage flow of IGVs within the fence network. The fence network may refer to a group of closed-loop businesses, organizations, professional services, or coalitions within a specific market or industry. These entities participate in IGV program by accepting the vouchers directly.

The server 102 may include a memory 106 and a processor 108. The memory 106 may further include various modules that enable the server 102 to manage IGV in the fence networks. These modules are explained in detail in conjunction with FIG. 2.

The memory 106 may store instructions that, when executed by the processor 108, may cause the processor 108 to manage IGV in the fence networks. As will be described in greater detail in conjunction with FIG. 2 to FIG. 7, in order to manage the IGV, the processor 108 in conjunction with the memory 106 may perform various functions including determining a base value, a unique alphanumeric key, and an expiration date to create an IGV, assigning an ownership of the IGV to a first user upon receiving a purchase request from the first user and required information of the first user, transferring the ownership of the IGV to a second user upon receiving a gift request from the first user and required information of the second user, and facilitating redemption of the IGV to the second user to utilize the IGV through at least one enterprise of a plurality of enterprises associated with one of the fence networks.

The memory 106 may also store various data (e.g., user's details, users account information, and user's proof of licenses or certifications, etc.) that may be captured, processed, and/or required by the server 102. The memory 106 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random-Access Memory (DRAM), Static Random-Access memory (SRAM), etc.).

Further, a database 104 may be connected to the server 102 and may be used to store critical information related to the IGV. By way of an example, the database 104 may store data such as users profile details, users account information, users proof of licenses or certifications, IGV details, transaction records, and other relevant information. Additionally, the database 104 may be periodically updated based on various factors, such as new IGV creations, transfers of ownership between gifters and recipients, redemption transactions within the fence network, buyback activities, and changes to participating enterprises or their details.

In some embodiments, the server 102 may be associated with an application (for example, a mobile application or a web application). The application may be accessible by an electronic device that provides a user interface (UI) for various functions related to the IGV. Examples of the electronic device may include, but is not limited to, a computer, a tablet, a smartphone, a smart TV, and a laptop. The application may act as a platform where the producer, gifter, recipient, and enterprises may access and interact with the system 100. Through the UI provided by the mobile application or web application, the users may perform tasks such as, but not limited to, creating IGVs, transferring ownership of IGVs from gifters to recipients, and managing their IGV accounts.

By way of an example, the UI may allow the producer to configure parameters of the IGVs, such as base values, expiration dates, administrative fees, and a predetermined incentive for buyback. The producer may input this information through the mobile application or web application, which then communicates with the server 102 and database 104 to create the IGVs and store their details.

For gifter and recipient, the UI may enable them to view and manage their IGVs. The gifter may select a desired IGVs, specify recipient, and initiate the transfer process. The recipient, on the other hand, may access the UI to claim ownership of received IGVs, view their IGV balance, and choose redemption options.

The UI may also allow the enterprises participating in the system 100 to interact with the server 102 and perform various actions. This may include verifying validity of IGVs, accepting IGVs as payment for goods or services, and initiating the buyback process when desired.

Figure 2:
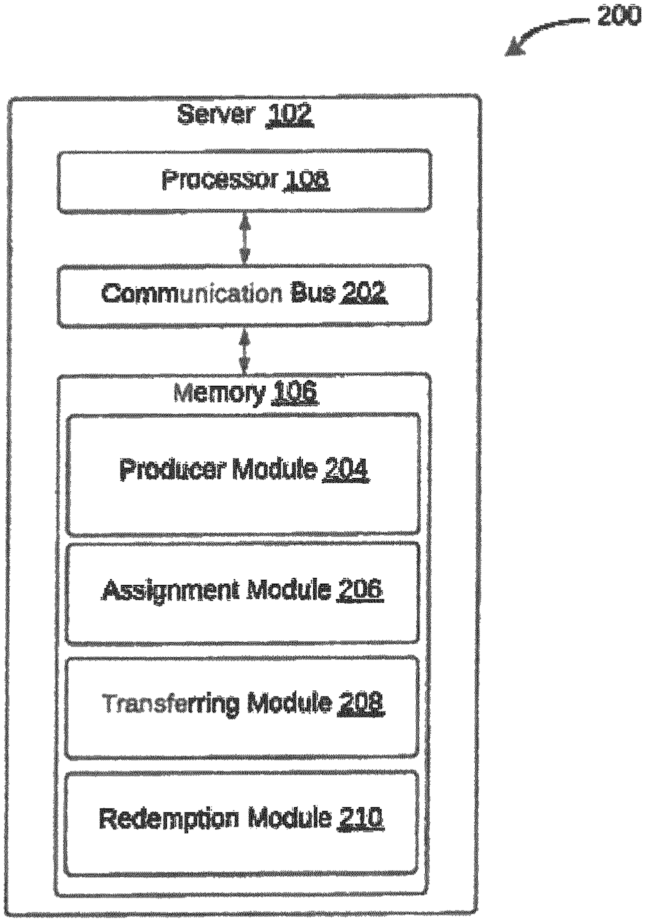
FIG. 2 is a block diagram illustrating various modules within a memory of a server configured to manage IGV in fence networks, in accordance with an embodiment.

Referring now to FIG. 2, a block diagram 200 of various modules within the memory 106 of the server 102 that is configured to manage IGV in fence networks is illustrated, in accordance with an embodiment of the present disclosure. FIG. 2 is explained in conjunction with elements from FIG. 1. The server 101 may include the processor 108 and the memory 106 communicatively coupled to the processor 108 via a communication bus 202. The memory 106 may store processor instructions. The processor instructions, when executed by the processor 108, may cause the processor 108 to implement one or more embodiments of the present disclosure. The memory 106 may include a producer module 204, an assignment module 206, a transferring module 208, and a redemption module 210.

The producer module 204 plays a key role in the creation of IGV within the fence network. In particular, the producer module 204 in conjunction with the processor 108 may determine the base value, a unique alphanumeric key, and an expiration date to create the IGV. For example, the producer module 204 may receive a cost comprising the base value, administrative fee, and a predetermined incentive from a first user (e.g., a gifter) in a producer account before assigning ownership of the IGV to the first user. The IGV may include the predetermined incentive in a collateral account.

Once the IGV is created, the assignment module 206 in conjunction with the processor 108 may assign an ownership of the IGV to the first user upon receiving a purchase request from the first user and required information of the first user. Additionally, prior selling the IGV to the first user, the assignment module 206 may verify an authenticity and validity of the IGV by validating the alphanumeric key, the expiration date, and the predetermined incentive in the collateral account.

Thereafter, the transferring module 208 in conjunction with the processor 108 may facilitate the transfer of ownership of the IGV from the first user (gifter) to the second user (recipient). It operates based on a gift request received from the first user and required information of the second user. The required information of the first user and the second user may include corresponding users' details, users' account information, and users' proof of licenses or certifications.

The redemption module 210 in conjunction with the processor 108 may facilitate redemption of the IGV by the second user (recipient) within the fence network. It enables the recipient to utilize the IGV through participating enterprises associated with one of the fence networks. The redemption module 210 ensures a smooth redemption process, allowing the recipient to select and utilize the IGV at one or more enterprises within the network. The recipient may utilize the IGV for a commodity through one of the enterprises associated with the fence networks. The commodity may be a good purchased or a service utilized by the second user.

In some embodiments, the redemption module 210 may facilitate direct redemption of the IGV purchased by the first user (gifter). This means that the first user has the option to utilize the IGV themselves instead of transferring ownership to the second user (recipient) within the fence network. When the first user chooses to directly redeem the IGV, they may utilize it for their own benefit.

In some embodiments, the producer may also act as a gifter within the fence network This means that the producer may fund the IGV by providing the necessary amount, including the base value, administrative fee, and predetermined incentive, and distribute it as a promotional tool. By taking on a role of the gifter, the producer may proactively promote the use of IGVs within the fence network by offering them as gifts to recipients.

For example, the producer may allocate a certain budget for promotional purposes and use it to fund IGVs of various denominations. These IGVs may then be distributed to recipients as part of marketing campaigns, loyalty programs, or special promotions. By doing so, the producer not only encourages the adoption and use of IGVs but also increases the visibility and reach of the system within the fence network.

The lifespan of the IGV may be better explained by way of an exemplary embodiment. In the exemplary embodiment, consider an automotive IGV model with three available options i.e., $5000, $10,000, and $20,000. Each IGV includes a retailer incentive of $100 and an administrative fee of $200. When a gifter decides to purchase the $10,000 IGV. They pay the face value (e.g., base value) of $10,000, the incentive for the redeeming retailer (i.e., $100), and the producer's administrative fee (i.e., $200), totalling $10,300. The producer module 204 creates the IGV with its unique alphanumeric key and assigned an expiration date, while earmarking $10,100 for eventual reimbursement.

The gifter, now the owner of the $10,000 IGV, decides to transfer ownership to a recipient. They initiate a gift request and provide the required information of the recipient. The transferring module 208 may facilitate this transfer, ensuring that the ownership of the IGV is successfully transferred to the recipient.

The recipient, now the owner of the $10,000 IGV, decides to redeem it at a local dealership. They may visit the dealership and choose a vehicle with a price tag of $9,500. The redemption module 210 comes into play, facilitating the seamless redemption process. The dealership acknowledges the ownership transfer of the IGV and discounts the transaction by the value of the IGV ($10,000). As a result, the recipient doesn't need to pay any additional funds to cover the cost of the vehicle.

Following the transaction, the dealership has two options. They may either use the $10,000 IGV towards a $15,000 order of tires they are receiving the next week, effectively utilizing the IGV within the fence network. Alternatively, they may choose to cash out the IGV with the producer, thereby ending the IGV's cycle. In this example, the dealership decides to cash out. They select their preferred payment option, provide the necessary details, and receive a payment of $10,100 (minus any transaction fees associated with the chosen option) from the producer.

It should be noted that all such aforementioned modules 202-210 may be represented as a single module or a combination of different modules. Further, as will be appreciated by those skilled in the art, each of the modules 202-210 may reside, in whole or in parts, on one device or multiple devices in communication with each other. In some embodiments, each of the modules 202-210 may be implemented as dedicated hardware circuit comprising custom application-specific integrated circuit (ASIC) or gate arrays, off-the-shelf semiconductors such as logic chips, transistors, or other discrete components. Each of the modules 202-210 may also be implemented in a programmable hardware device such as a field programmable gate array (FPGA), programmable array logic, programmable logic device, and so forth. Alternatively, each of the modules 202-210 may be implemented in software for execution by various types of processors (e.g., processor 108). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for IGV management in fence networks. For example, the system 100 and the associated server 102 may manage IGV in the fence networks by the processes discussed herein. In particular, as will be appreciated by those of ordinary skill in the art, control logic and/or automated routines for performing the techniques and steps described herein may be implemented by the system 100 and the associated server 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be included in the one or more processors on the system 100.

Figure 3:
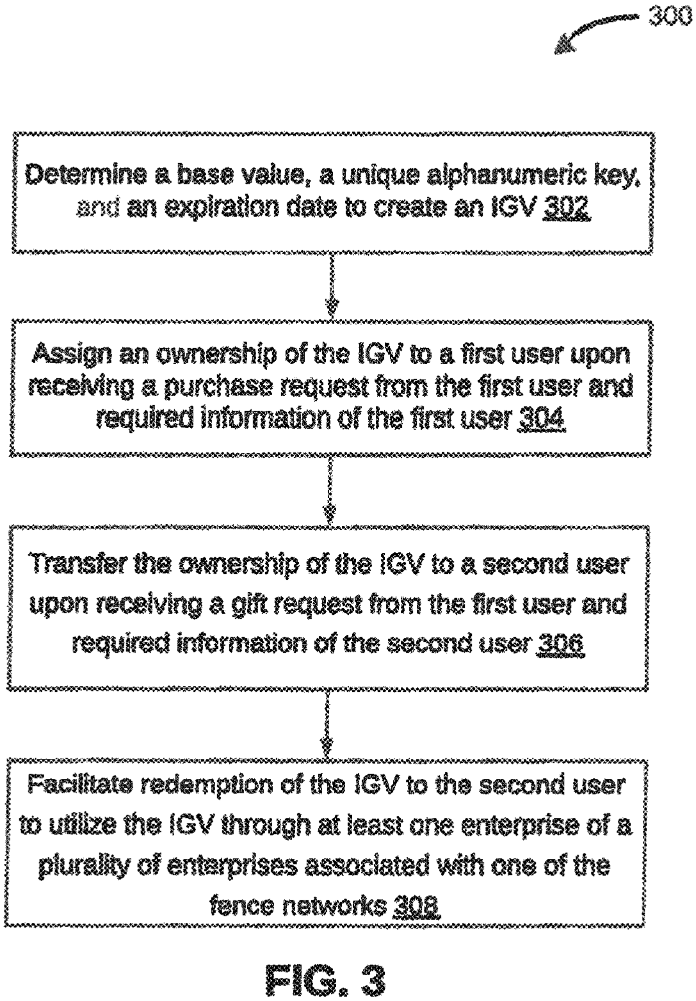
FIG. 3 illustrates a flowchart of a method for IGV management in fence networks, in accordance with an embodiment.

Referring now to FIG. 3, a flowchart 300 of a method for IGV management in fence networks is illustrated, in accordance with an embodiment. It should be noted that the steps 302-308 may be executed by the modules 202-210. At step 302, a base value, a unique alphanumeric key, and an expiration date may be determined to create an IGV.

Once the IGV is created, at step 304, ownership of the IGV may be assigned to a first user upon receiving a purchase request from the first user and required information of the first user. In some embodiments, the producer may receive a cost including the base value, an administrative fee, and a predetermined incentive, from the first user, in a producer account, before assignment of the ownership of the IGV to the first user. It should be noted that the base value of the IGV and the predetermined incentive may be held in a separate account as collateral. The first user may correspond to a gifter.

In other words, the gifter may purchase the IGV by paying the base value, the administrative fee, and the predetermined incentive to the producer. The base value is an initial value, or a face value assigned to the IGV. It represents the monetary worth of the voucher that may be redeemed by a recipient. The administrative fee is an additional charge imposed by the producer. It is intended to cover the administrative costs associated with managing and operating the system. The administrative fee may help to support the infrastructure, maintenance, and services provided by the producer. Moreover, the predetermined incentive is a fixed amount offered to the redeeming retailer as an incentive for accepting and processing the IGV. It may encourage retailers to participate in the IGV management system and accept the vouchers as a payment method.

In some embodiments, the producer may verify an authenticity and validity of the IGV prior selling the IGV to the first user. The verification may include validating the alphanumeric key, the expiration date, and the predetermined incentive in the collateral account.

The alphanumeric key assigned to each IGV may serve as a unique identifier. During the validation process, the producer may compare the alphanumeric key provided by the first user with the corresponding key stored in a database. This comparison ensures that the key matches the one generated by the producer and hasn't been tampered with or duplicated. If the alphanumeric key is verified successfully, it confirms the authenticity of the IGV.

The expiration date may be set by the producer when the IGV is created. To validate the expiration date, the producer may compare a current date with the assigned expiration date of the IGV. If the current date is earlier than the expiration date, the IGV is considered valid and still within its usable timeframe. However, if the current date is later than the expiration date, the IGV is considered expired and may no longer be redeemable.

The predetermined incentive is an additional amount provided to the redeeming retailer as an incentive for accepting the IGV. To validate the predetermined incentive, the producer may verify whether the allocated funds for the incentive are present in the collateral account associated with the IGV. This verification ensures that the predetermined incentive is available and may be honoured when the IGV is redeemed.

Upon receiving a gift request from the first user and required information of the second user, at step 306, the ownership of the IGV may be transferred to a second user. The second user may correspond to the recipient. The required information of the first user (gifter) and the second user (recipient) includes their corresponding user details, account information, and proof of licenses or certifications.

The user details may include personal information of the users, such as their full name, email address, billing and shipping address, phone number, and any other relevant contact information. The account information may include users account-related information, such as their chosen account name and password. This enables them to set up and access their accounts within the system. The account information may help in securely managing user profiles and facilitating transactions. Moreover, depending on the specific industry or market associated with the IGV, users may need to provide proof of licenses or certifications related to their eligibility or qualifications. This requirement ensures that the users comply with any necessary legal or regulatory requirements. For example, in industries like healthcare, finance, or legal services, users may need to provide proof of professional licenses or certifications to participate in the IGV management system.

When transferring ownership of the IGV to the recipient, there are two possible scenarios to consider. In a first scenario, if the recipient already has an IGV account, the gifter may send the IGV directly to their account. In a second scenario, if the recipient does not have the IGV account, the gifter may create a placeholder account on their behalf, which may later be claimed by the recipient. The method for transferring the ownership to the second user is further explained in conjunction with FIG. 6.

Once the ownership is transferred to the second user, at step 308, redemption of the IGV may be facilitated to the second user to utilize the IGV through at least one enterprise of a plurality of enterprises associated with one of the fence networks. The IGV may be utilized for a commodity through at least one enterprise of the plurality of enterprises associated with the one of the fence networks. The commodity may be a good purchased or a service utilized by the second user. The plurality of enterprises may be an organisation, a business, a non-profit organisation, a producer's site, a retailer, distributors, suppliers, or an affiliated organisation.

To provide a clear understanding of the IGV management process, the process may be explained by way of an example. In this example, the producer offers three different IGV options for this market i.e., $20, $50, and $100. The producer also sets an administrative fee of $4 and a predetermined monetary incentive for buyback of $1. Additionally, the IGVs in this market have a 5-year expiration date. The creation of the IGV may be triggered in two ways i.e., when a gifter purchases the IGV directly from the producer, or when the producer acts as a gifter by funding the IGV and distributing it as a promotional tool. In either case, funds equivalent to the base value of the IGV, along with the predetermined monetary incentive, are held in a separate account as collateral for the issued IGV.

Let's consider a $20 IGV for this example. If the gifter does not have an account, they may send an anonymous gift. However, if they have an existing account or wish to create one, they may need to provide their full name, email address, choose an account name and password, and optionally provide additional information such as a profile picture, billing/shipping address, proof of military or veteran status, phone number, licenses held, EIN (Employer Identification Number), and alike. These optional provisions are not mandatory for purchasing and giving IGVs but may be required for certain functions within the IGV management system.

Once the gifter decides on a $20 IGV, they purchase it from the producer for $25. Out of the total amount, $21 is automatically allocated to a dedicated account for buyback by the producer, and the producer collects their administrative fee of $4. At this point, the IGV is considered to be created. The producer assigns the IGV an expiration date, which is set to 5 years from the date of issue and generates a unique alphanumeric key for tracking purposes. The information related to the IGV, including its expiration date and alphanumeric key, is stored in a producer's database, enabling seamless transfer of ownership, and providing a historical timeline for each IGV.

The gifter may view the newly created IGV in their wallet on the IGV site or an application. Multiple IGVs owned by the gifter are displayed in groups, such as "$20 IGV x2, $50 IGV x0, $100 IGV x1," allowing for easy inspection of individual IGVs. The IGVs are sorted based on their expiration dates, with priority given to the IGVs that are closest to expiration. At this stage, the IGV is considered to be in "Public Circulation", ready to be utilized by the gifter or transferred to a recipient.

Once the IGV is transferred to the recipient, the recipient now owns the IGV. The recipient may then choose to redeem the IGV on the producer's site for goods or services either through affiliate businesses/organizations or directly from the producer.

If the recipient chooses the affiliate option, the order is processed by the affiliate, and the IGV funds are allocated to the producer's account. The affiliate is paid by the producer based on the agreed schedule (e.g., end of the business day, weekly, monthly). If the recipient decides to donate the IGV, the producer may facilitate the donation to a charity or nonprofit organization relevant to the industry.

Figure 4:
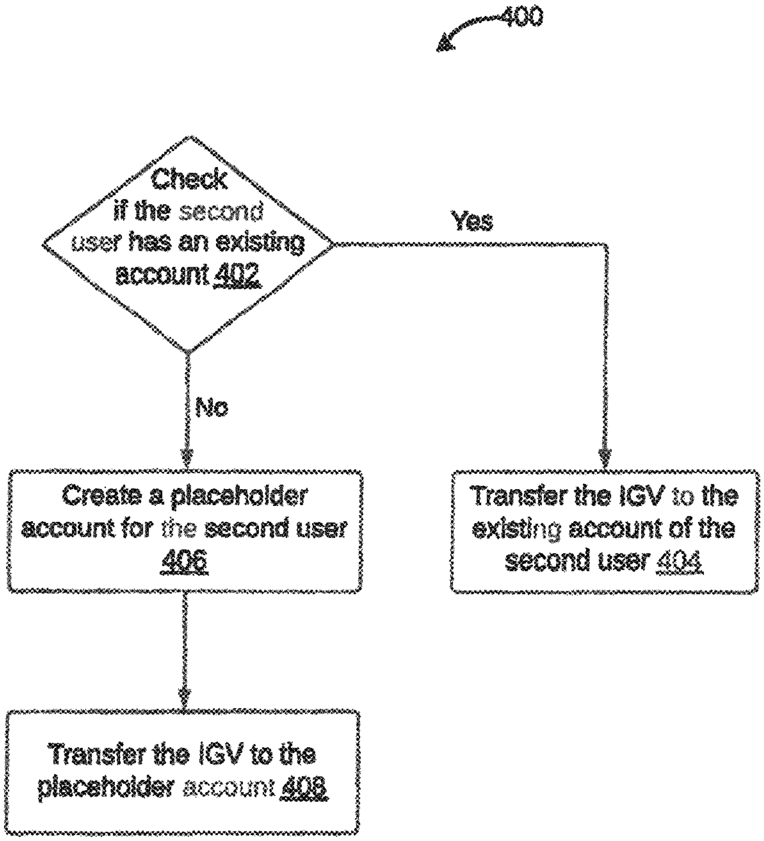
FIG. 4 illustrates a flowchart of a method for transferring ownership of IGV to a second user, in accordance with an embodiment.

Referring now to FIG. 4, a flowchart 400 of a method for transferring ownership of IGV to a second user is illustrated, in accordance with an embodiment of the present disclosure. With reference to step 306 in FIG. 3, in order to transfer the ownership of the IGV to the second user (e.g., recipient), initially the first user (e.g., gifter) may check if the second user has an existing account at step 402.

If the second user has the existing account, then at step 404, the IGV may be transferred to the existing account of the second user. In order to transfer the IGV to the existing account of the second user i.e., the recipient, the gifter may use an option in the IGV site or application to send one of their IGVs to the account holder recipient. Further, the gifter may select a specific IGV, which is transferred from the gifter to the recipient.

If the second user doesn't have the existing account, then at step 406, a placeholder account may be created for the second user. More particularly, to create a placeholder account for the recipient, the gifter may input the recipient's name and email. The email provided may be notified, and the email owner may claim the placeholder account by setting up an account.

Further, at step 408, the IGV may be transferred to the placeholder account. It should be noted that this placeholder account may serve as a temporary storage for the IGV until the second user claims it. Later on, the second user may claim the placeholder account by setting up their own IGV account, ensuring a smooth transition of ownership. Once the second user sets up their own IGV account, any vouchers held in the placeholder account are automatically transferred to the recipient's newly made account. Subsequently, the placeholder account is deleted, and the IGV is securely housed in the recipient's account for their future use.

Alternatively, the gifter may provide a scannable QR code as a physical or digital voucher to the recipient that does not have the IGV account. The scannable code may be used by the recipient for redeeming the IGV through the at least one enterprise.

When the recipient receives the physical voucher and scans it, they are directed to the IGV producer's site or application. Upon scanning, the recipient is notified that they have received a voucher from the gifter (unless it was sent anonymously). They are prompted to set up an account by following the account setup process provided on the IGV producer's platform.

Before finalizing the exchange, a party (for example, the gifter) giving the IGV may be shown a warning, stating that this is not a reversible transaction. The gifter may be asked to review the information and confirm that everything is correct. Once the gifter confirms, the transfer of ownership may be finalized, and the recipient now becomes the rightful owner of the IGV.

In the event that the recipient decides to re-gift the IGV to a new recipient, the process outlined above may be repeated for the relevant parties. It should be noted that repeating the transfer process has no effect on the expiration date of the IGV, which was initially set at the time of its creation. This transfer and re-gifting process can be repeated indefinitely until the IGV reaches its expiration date. The method of re-gifting the IGV to the new recipient is further explained in conjunction with FIG. 11.

Figure 5:
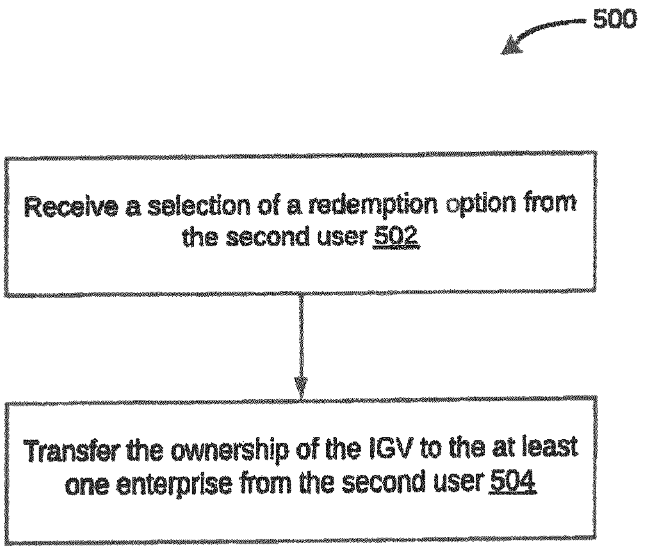
FIG. 5 illustrates a flowchart of a method for facilitating redemption of IGV to a second user, in accordance with an embodiment.

Referring now to FIG. 5, a flowchart 500 of a method for facilitating redemption of IGV to a second user is illustrated, in accordance with an embodiment of the present disclosure. With reference to step 308 in FIG. 3, in order to facilitate the redemption of the IGV to the second user, a selection of a redemption option may be received from the second user at step 502. It should be noted that the redemption option may be associated with at least one enterprise.

Based on the selection of the redemption option, at step 504, the ownership of the IGV may be transferred to at least one enterprise from the second user, after deducting a transaction fee from an account associated with the second user. Thus, the enterprises 114 may interact with the system 100 to accept IGVs as a payment, offer goods or services for redemption, or participate in the buyback process. The method for buyback of IGV is explained in greater detail in conjunction with FIG. 6.

In a more elaborative way, once the recipient has received the IGV, the recipient may redeem the IGV by selecting at least one option that works best for them from the available redemption options. A first redemption option may include redeem their IGV on the producer's site for goods or services through an affiliate business or organization, or for goods or services offered directly from the producer.

If the recipient selects this option, it completes the IGV process. In particular, the recipient agrees to the transfer, and the funds associated with the IGV are allocated to the producer's account. The recipient's order is processed by the affiliate, and the affiliate is paid by the producer according to the agreed-upon schedule (e.g., end of the business day, every Monday, on the 15th of each month, once the balance reaches a certain threshold).

A second redemption option may include donation of the IGV. In this option, the producer allows the recipient to donate the IGV to a charity or nonprofit of their choosing, as long as it is industry relevant. The producer remits funds to the specified organization on the recipient's behalf in batches on a monthly basis. This option also completes the IGV process, as the recipient agrees to the transfer, and the funds are allocated to the producer's account.

A third redemption option may include redeem their IGV at a fence link for goods or services. The fence link may be defined as an individual closed-loop business or organization within the fence network. In this option, the recipient may choose to redeem their IGV at a physical or online location operated by the fence link. They select their desired goods or services, and the fence link verifies the validity of the IGV. Once verified, the fence link completes the transaction by taking ownership of the IGV using existing or proprietary integration technology and delivers the indicated goods or services. This option puts the IGV in a fence network circulation, allowing for further transactions within the fence network. The fence network circulation may be referred to stages for IGVs in which they are owned by persons or entities within the fence network.

Figure 6:
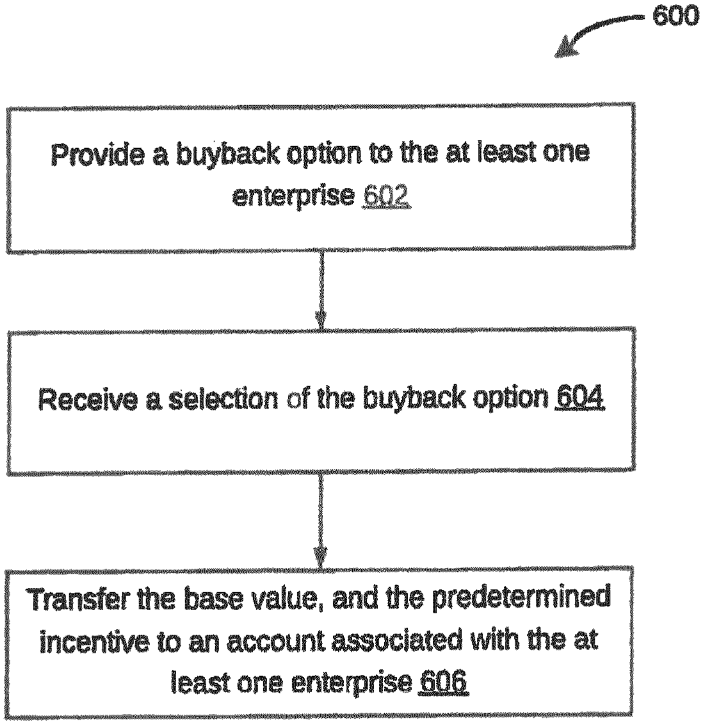
FIG. 6 illustrates a flowchart of a method for buyback of IGV, in accordance with an embodiment.

Referring now to FIG. 6, a flowchart 600 of a method for buyback of IGV is illustrated, in accordance with an embodiment of the present disclosure. With reference to step 504 in FIG. 5, once the ownership of the IGV is transferred to the at least one enterprise from the second user, the producer may provide a buyback option to the at least one enterprise at step 602. The buyback option may refer to a process in which the producer offers an opportunity for the at least one enterprise to sell back the IGV they acquired from the second user. This buyback option allows the enterprise to transfer the ownership of the IGV back to the producer in exchange for a specified amount. It should be noted that the producer may set up this buyback option in advance as an automatic process when certain thresholds are met, or it may be done as a manual process on the producer's site or application.

At step 604, the buyback option may be selected by at least one enterprise. The producer may provide the fence link with the buyback option, allowing them to sell back the acquired IGV. This option may be presented on the producer's platform, where the fence link may select it as a desired course of action. As mentioned earlier in reference to FIG. 5, in the case of the third redemption option, the recipient transfers ownership of the IGV to the fence link and does not complete the IGV process. The fence link has the options of selling the IGV back to the producer, thereby completing the IGV process.

In this option, the fence link agrees to relinquish ownership of the IGV in exchange for the funds allocated for the IGV, including the predetermined monetary incentive for buyback. In continuation to the previous example, referring to the $20 IGV with a $1 incentive for buyback, the total amount due to the fence link is $21. Fees associated with the transfer follow a tiered schedule and are deducted from the amount transferred to the fence link. The fees are determined by the producer and dictated by current rates. The producer may offer multiple payment options, each with its own fee schedule, allowing the fence link to choose which one is best for them. With the $20 IGV example, the producer may deduct the $1.49 fee from the $21 total. The producer processes the payment of $19.51 to the fence link.

Thereafter, at step 606, the base value and the predetermined incentive may be transferred to an account associated with the at least one enterprise. The producer transfers the funds owed to the enterprise, including the base value and the predetermined incentive, as agreed upon in the buyback process. This completes the buyback transaction, and the IGV process for that particular IGV is now finished.

Apart from selling the IGV back to the producer, the fence link may also have the option of transferring the IGV, individually or by batch, to another fence link in the same fence network in exchange for goods or services. For instance, let's revisit the automotive IGV example mentioned earlier. The fence link, in this case, a car dealership, owns a $10,000 IGV that they wish to use for a $15,000 order of tires from a tire manufacturer who is also the fence link within the same network.

This option benefits the dealership as the ownership transfer of the IGV is instantaneous, eliminating the need for depositing funds in a bank and waiting for clearance. The tire manufacturer, on the other hand, benefits from receiving ownership of the IGV, which entitles them to the incentive for buyback if they choose to sell it back to the producer.

In this scenario, the tire manufacturer agrees to take ownership of the IGV in exchange for a $10,000 discount on their tire order. The transfer process is facilitated through the producer's platform, and once the balance is due, the tire manufacturer collects the remaining amount and completes the transaction.

As a fence link owner of the IGV, they have the flexibility to utilize any option mentioned in this section. This transfer option may be repeated multiple times for the same IGV and throughout the entire lifespan of the IGV.

Further, the fence link has the option to distribute IGVs they own as promotions or distribute them to their employees. This follows the same exchange procedure detailed previously, where the ownership of the IGV is transferred to the recipient. By distributing the IGVs, the IGVs are taken out of the fence network circulation and returned to a public circulation. The public circulation may be referred to a phase of an IGV's lifespan when it is available for general circulation and may be obtained by users who are not part of the fence network. During this phase, the IGV may be purchased, gifted, or otherwise transferred between individuals or entities outside the fence network.

Another option available to the fence links is to wait for expiration reconciliation. Most of the IGV's lifespan may be spent in public circulation before transitioning to fence network circulation. If the IGV expires while in public circulation, the funding associated with that IGV is released to the producer. To prevent any manipulation of near-expiration IGVs and allow flexibility for the fence links accepting close-to-expiry IGVs, all IGVs in the fence network circulation are automatically bought back by the producer one day before their expiration date. The producer's platform follows the preferred method of payment specified by the fence link for the buyback process. If no preferred method is indicated, the producer utilizes the option with the lowest associated fee. The IGV is then de-listed from the "active IGV database" and filed in a separate "filled IGV" database, marking the completion of the IGV process.

To better understand how the IGVs may be used in real-life situations, consider different scenarios in which individuals or organizations make use of the IGV management system for activities like personal gifting, financial assistance, and charitable initiatives.

Consider a scenario where Bob wants to celebrate his son's academic success in college, so he decides to send him a thoughtful gift. Bob purchases a $50 Restaurant IGV and sends it to his son, who is located out-of-state. Upon receiving the IGV, his son may choose to redeem it at a restaurant listed as a fence link by the producer. The son decides to use the IGV to receive a $50 discount on his meal at the chosen restaurant. This example demonstrates how IGVs can be used for personal gifting purposes, allowing individuals to send meaningful gifts to their loved ones.

Consider another scenario where Pete learns that his sister's husband has recently been laid off, and he wants to help alleviate their financial burden. Pete decides to provide his sister with a Grocery IGV subscription to support her budgeting efforts. He selects the value and duration of the subscription, such as $75 per week for 2 months. The IGVs are delivered according to Pete's chosen schedule, and his sister may use them at her local supermarket, which is listed as a Fence Link. By using the Grocery IGVs, Pete's sister may receive discounts on her groceries, helping her manage her expenses during this challenging period.

Moreover, consider a scenario where a nonprofit organization aims to assist low-income individuals with their energy bills. They collaborate with the IGV producer to implement a fundraising campaign. The nonprofit purchases batches of $100 Energy IGVs and distributes them to those in need. Additionally, they are listed as a recipient organization to which individuals may donate their unwanted IGVs. This allows the nonprofit to support their cause while providing energy assistance to disadvantaged individuals within the community. Through the utilization of IGVs, the nonprofit successfully raises funds and helps alleviate the burden of energy expenses for those in need.

Figure 7:
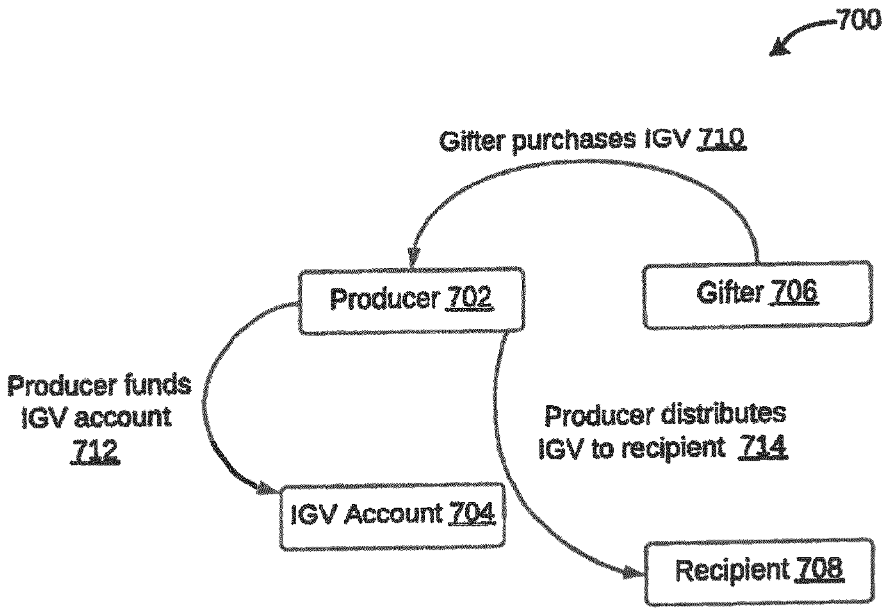
FIG. 7 illustrates an exemplary process flow for creation of IGV by gifter, in accordance with an embodiment.

Referring now to FIG. 7, an exemplary process flow 700 for creation of IGV by gifter is illustrated, in accordance with an embodiment of the present disclosure. The process flow 700 starts with the gifter 706 deciding to purchase an IGV from the producer 702, at step 710. The gifter 706 selects the desired IGV option and proceeds with the purchase by providing the necessary payment.

Upon receiving the payment from the gifter 706, the producer 702 allocates the funds to the IGV account 704, at step 712. These funds are set aside and held in a dedicated account specifically for the issued IGV.

Once the funds are allocated, the producer 702 transfers the ownership of the IGV from the gifter 706 to the intended recipient 708, at step 714. This transfer involves moving the IGV from the gifter's account to the recipient's IGV account.

With the successful transfer, the recipient 708 becomes the new owner of the IGV. They now have the rights and privileges associated with the IGV and may proceed with redeeming it for goods or services.

Figure 8:
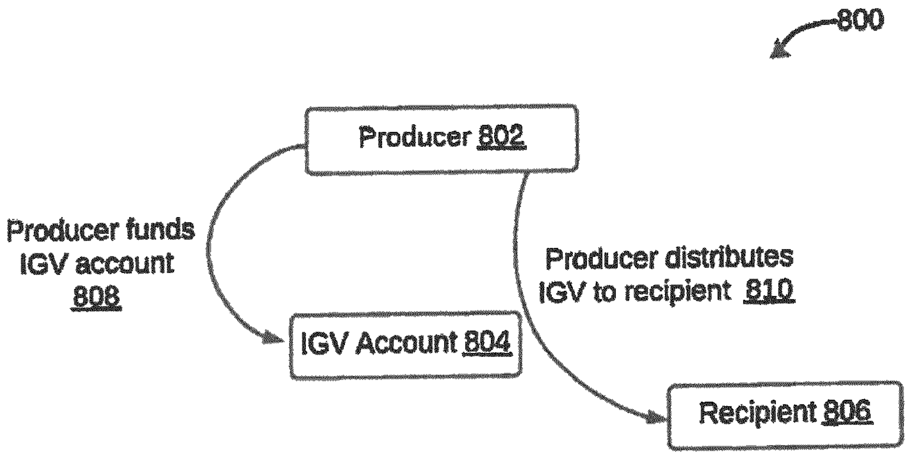
FIG. 8 illustrates an exemplary process flow for creation of IGV by producer, in accordance with an embodiment.

Referring now to FIG. 8, an exemplary process flow 800 for creation of IGV by producer is illustrated, in accordance with an embodiment of the present disclosure. The process flow 800 starts with the producer 802 receiving funds from various sources, such as gifter purchases or promotional activities.

These funds are then allocated to the IGV account 804, at step 808. The IGV account 804 serves as a repository for the allocated funds specifically designated for creating and managing IGVs. The account ensures that there are sufficient funds available to meet the demand for IGVs within the designated fence network.

Once the necessary funds are available in the IGV account 804, the producer 802 proceeds to distribute IGVs to recipient 806, at step 810. In particular, the producer 802 may select a recipient, who could be an individual or an organization, and transfers the ownership of the IGV from the producer's account to the recipient's IGV account.

Upon successful distribution, the recipient 806 becomes the new owner of the IGV. The IGV is now associated with the recipient's account, allowing them to utilize the IGV within the designated fence network. The recipient may redeem the IGV for goods, services, or other benefits offered by participating businesses or organizations.

Figure 9:
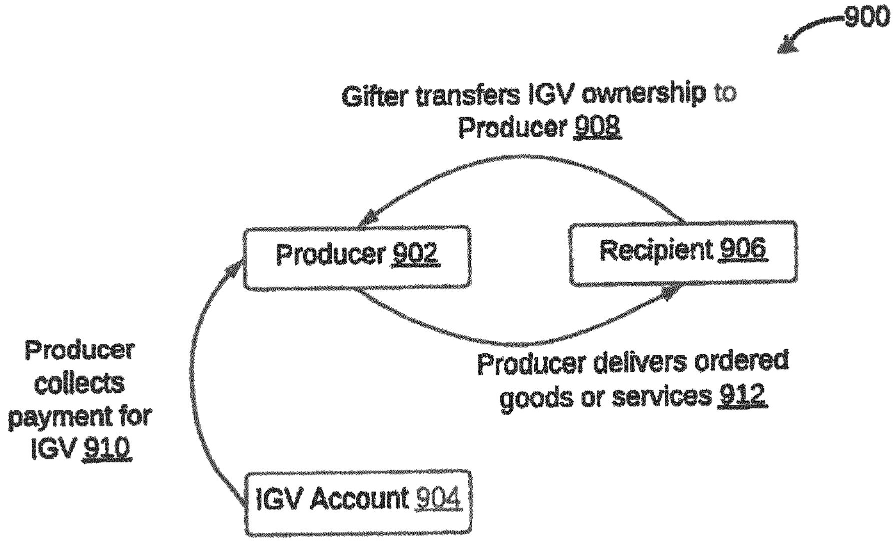
FIG. 9 illustrates an exemplary process flow for transferring IGV from recipient to producer for goods or services, in accordance with an embodiment.

Referring now to FIG. 9, an exemplary process flow 900 for transferring IGV from recipient to producer for goods or services is illustrated, in accordance with an embodiment of the present disclosure. The process flow 900 begins with the producer 902, acting as a gifter, transferring the ownership of the IGV to the recipient 906, at step 908. The producer selects and assigns the IGV to the recipient 906, indicating their intention to gift the IGV.

Once the producer 902 has transferred the ownership, the recipient 906 receives the IGV. The recipient 906 now becomes the new owner of the IGV and gains control over its redemption.

As the producer is also the original issuer of the IGV, the producer 902 may collect payment from the recipient 906 for the value of the IGV, at step 910. The payment serves as compensation to the producer 902 for the issued IGV.

After receiving payment, if applicable, the producer 902 fulfils the recipient's order by delivering the goods or services associated with the redeemed IGV, at step 912. This step ensures that the recipient receives the intended benefits of the IGV.

Figure 10:
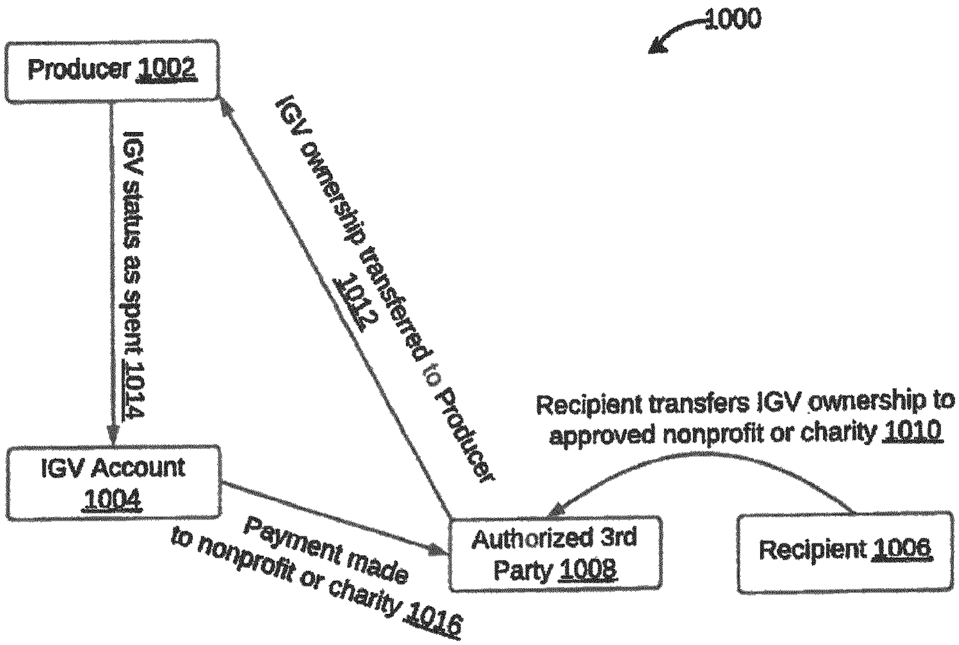
FIG. 10 illustrates an exemplary process flow for donating IGV by recipient to producer to nonprofit, in accordance with an embodiment.

Referring now to FIG. 10, an exemplary process flow 1000 for donating IGV by recipient to producer to nonprofit is illustrated, in accordance with an embodiment of the present disclosure. The process flow 1000 begins with the recipient 1006, who currently owns the IGV, transferring the ownership of the IGV to an approved nonprofit or charity, at step 1010. The recipient 1006 selects the specific nonprofit or charity to whom they wish to donate the IGV.

After the recipient 1006 has transferred the ownership to the nonprofit or charity, the nonprofit or charity, acting on behalf of the producer 1002, transfers the ownership of the IGV to the producer 1002, at step 1012. This step ensures that the producer 1002 is now the new owner of the IGV.

As a result of the donation, the producer 1002, as a gesture of support, makes a payment to the approved nonprofit or charity, at step 1016. This payment serves as a contribution to the nonprofit or charity for their involvement in the donation process.

Once the ownership transfer and payment are complete, the status of the IGV is updated to "spent" in the IGV account 1004, at step 1014. This designation indicates that the IGV has been successfully utilized for charitable purposes.

An authorized third party, represented as Authorized 3rd Party 1008 in the process flow 1000, may be involved in facilitating the transfer of ownership to the producer 1002 and ensuring the smooth execution of the donation process. This third party helps to ensure compliance, security, and transparency throughout the transaction.

Figure 11:
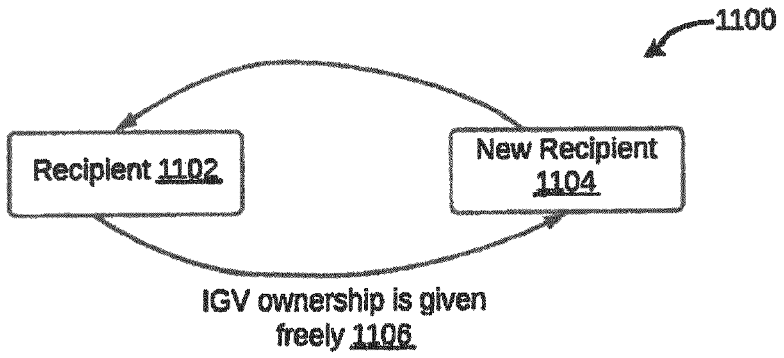
FIG. 11 illustrates an exemplary process flow for transferring of IGV from recipient to new recipient, in accordance with an embodiment.

Referring now to FIG. 11, an exemplary process flow 1100 for transferring of IGV from recipient to new recipient is illustrated, in accordance with an embodiment of the present disclosure. The process flow 1100 begins with the original recipient 1102 of the IGV deciding to transfer the ownership of the IGV to a new recipient 1104. This decision may be based on various reasons, such as the recipient 1102 wanting to share the gift with someone else or not having a personal use for the IGV.

The original recipient 1102 freely gives the ownership of the IGV to the new recipient 1104, at step 1106. This transfer of ownership is a voluntary act without any monetary exchange or transaction involved.

Once the ownership of the IGV is transferred, the new recipient 1104 becomes the new owner of the IGV. They may now utilize the IGV according to its terms and condition.

Figure 12:
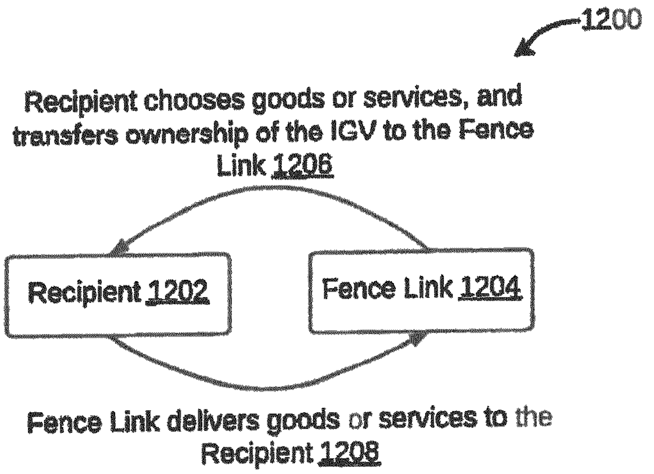
FIG. 12 illustrates an exemplary process flow for transferring of IGV from recipient to fence link, in accordance with an embodiment.

Referring now to FIG. 12, an exemplary process flow 1200 for transferring of IGV from recipient to fence link is illustrated, in accordance with an embodiment of the present disclosure. The recipient 1202 is the current owner of the IGV and wishes to utilize it for goods or services offered by a fence link 1204.

The fence link 1204 is a business or organization that is part of the fence network and accepts IGVs as a form of payment. They offer goods or services that may be redeemed using the IGV.

The recipient 1202 selects the desired goods or services offered by the fence link 1204 and agrees to transfer the ownership of the IGV to the fence link 1204 as payment, at step 1206. This transfer of ownership may be done through a digital platform or any other suitable means.

Once the ownership of the IGV is transferred to the fence link 1204, the fence link 1204 provide the selected goods or services to the recipient 1202. This may include delivering physical goods, providing access to digital content, or any other form of fulfilling the recipient's chosen redemption option.

Figure 13:
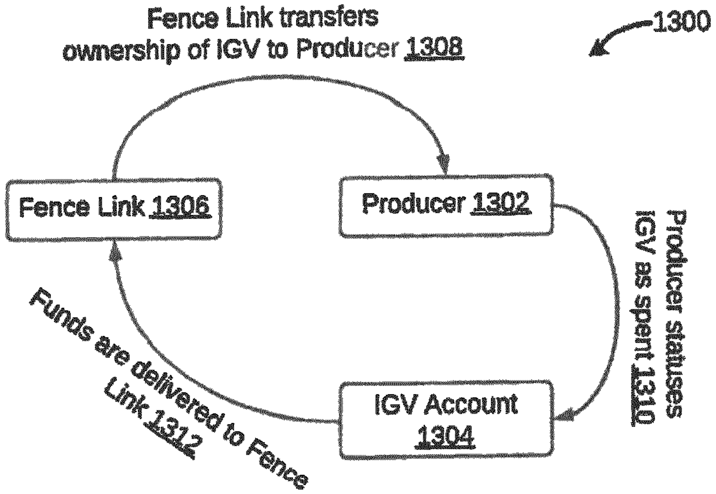
FIG. 13 illustrates an exemplary process flow for transferring of IGV from fence link to producer, in accordance with an embodiment.

Referring now to FIG. 13, an exemplary process flow 1300 for transferring of IGV from fence link to producer is illustrated, in accordance with an embodiment of the present disclosure. The process flow 1300 starts with the fence link 1306 initiating the transfer of ownership of the IGV back to the producer 1302, at step 1308. This may be done through a digital platform or any other suitable means.

Upon transferring the ownership of the IGV, the producer 1302 delivers the agreed-upon funds to the fence link 1306, at step 1312. The funds may be transferred electronically, through a designated payment method, or any other suitable arrangement.

The IGV account 1304 is the dedicated account where the producer 1302 holds funds associated with IGVs, including the funds allocated for buybacks. After the transfer is completed and the funds are delivered to the fence link 1306, the producer 1302 updates the status of the IGV in the system to mark it as spent, at step 1310. This indicates that the IGV has been returned and the transaction is finalized.

Figure 14:
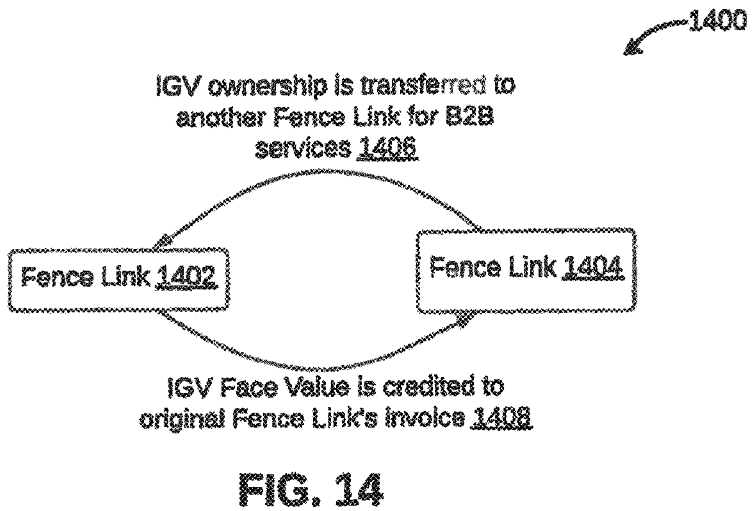
FIG. 14 illustrates an exemplary process flow for transferring of IGV from fence link to fence link, in accordance with an embodiment.

Referring now to FIG. 14, an exemplary process flow 1400 for transferring of IGV from fence link to fence link is illustrated, in accordance with an embodiment of the present disclosure. The fence link 1402 currently holds ownership of the IGV and wishes to transfer it to another fence link 1404. The fence link 1404 agrees to accept the IGV from the fence link 1402 in exchange for B2B (business-to-business) services or any other agreed-upon arrangement.

The fence link 1402 initiates the transfer process by transferring the ownership of the IGV to the fence link 1404, at step 1406. This transfer may be facilitated through a digital platform or any other suitable means.

Upon receiving the ownership of the IGV, the fence link 1404 credits the base value of the IGV to the original fence link's invoice, at step 1408. This effectively provides a credit or discount equivalent to the base value of the IGV to the fence link 1402 for their services or purchases within the B2B arrangement.

Figure 15:
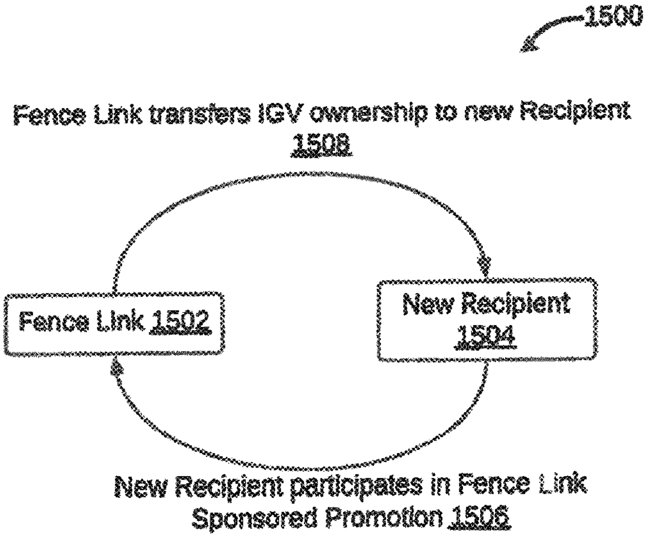
FIG. 15 illustrates an exemplary process flow for transferring of IGV from fence link to new recipient, in accordance with an embodiment.

Referring now to FIG. 15, an exemplary process flow 1500 for transferring of IGV from fence link to new recipient is illustrated, in accordance with an embodiment of the present disclosure. As part of the transfer process, the new recipient 1504 may participate in a promotion or special offer sponsored by the fence link 1502, at step 1506. This may include discounts, incentives, or other benefits provided by the fence link 1502 to the new recipient 1504.

The fence link 1502 transfers the ownership of the IGV to the new recipient 1504, officially transferring the rights and benefits associated with the IGV, at step 1508. This transfer may be facilitated through digital platforms, physical vouchers, or any other suitable means.

Figure 16:
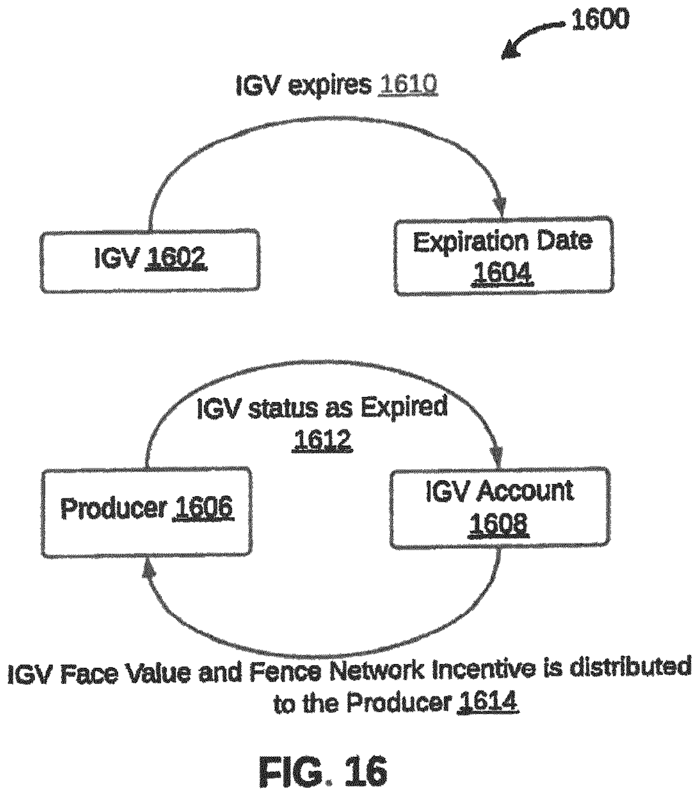
FIG. 16 illustrates an exemplary process flow for IGV expiration while in general circulation, in accordance with an embodiment.

Referring now to FIG. 16, an exemplary process flow 1600 for IGV expiration while in general circulation is illustrated, in accordance with an embodiment of the present disclosure. Once the expiration date 1604 is reached, the IGV 1602 is considered expired and no longer usable for redemption. The status of the IGV is updated accordingly to reflect its expired state, at step 1612.

When the IGV 1602 expires while in general circulation, at step 1610 the face value of the IGV 1602 and any associated incentives or funds held in the IGV account 1608 are distributed to the producer 1606, at step 1614. This ensures that all funds associated with the expired IGV are returned to the producer 1606.

Figure 17:
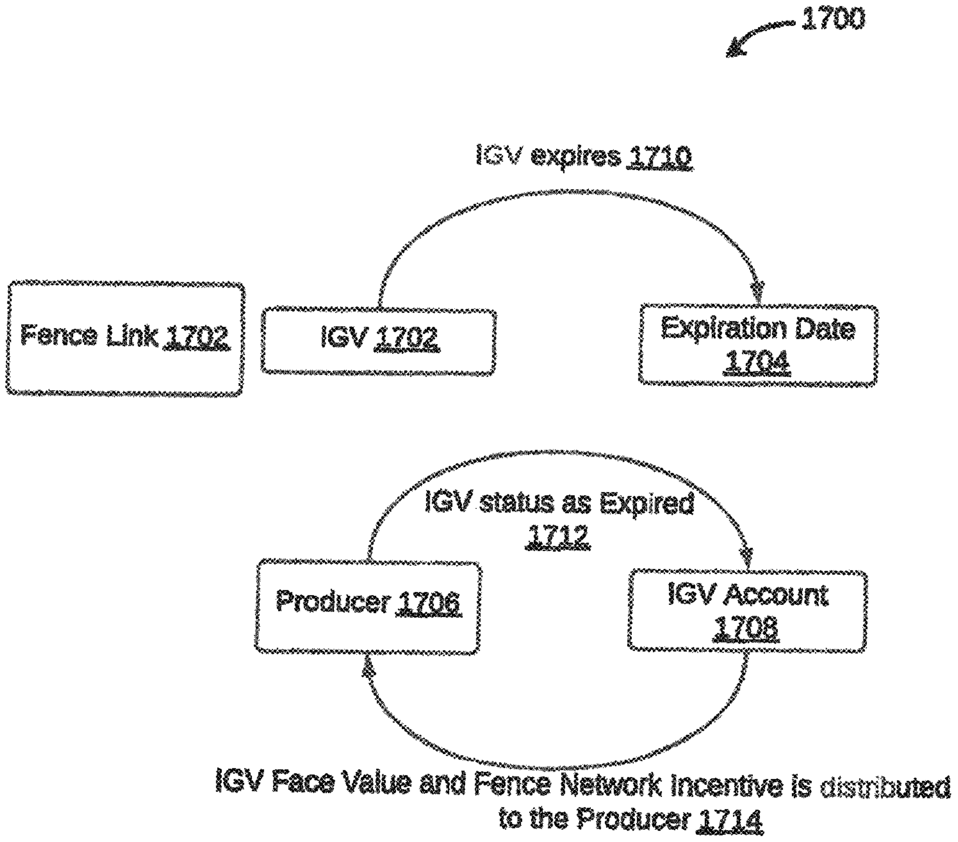
FIG. 17 illustrates an exemplary process flow for IGV expiration while in fence network circulation, in accordance with an embodiment.

Referring now to FIG. 17, an exemplary process flow 1700 for IGV expiration while in fence network circulation is illustrated, in accordance with an embodiment of the present disclosure. When the expiration date 1704 is reached, the IGV 1702 is considered expired and no longer valid for redemption, even within the fence network 1702.

The status of the IGV 1702 is updated to indicate that it has expired while in fence network circulation, at step 1712. When the IGV 1702 expires while in fence network circulation, at step 1710, the face value of the IGV and any associated incentives or funds held in the IGV account 1708 are distributed to the producer 1706, at step 1714. This ensures that all funds associated with the expired IGV are returned to the producer 1706.

As will be appreciated by those skilled in the art, the techniques described in the various embodiments discussed above are not routine, or conventional, or well understood in the art. The present disclosure addresses various issues and provides solutions to the following problems as discussed below:

For the giver: The IGV offers assurance that the gift may be used as intended. It eliminates logistical and legal restrictions that may arise when shipping certain gifts. It also provides the opportunity for the giver to offer a thoughtful gift related to the recipient's interests, even if the giver lacks in-depth knowledge about those interests. For example, Joe wants to get a gift for his sister's husband who likes wine. Instead of choosing a specific bottle that may not suit his recipient's tastes, Joe can opt to give an alcohol IGV, allowing the recipient to select their own bottle from a local retailer.

For the recipient: The IGV provides an easy and versatile payment option. Redeeming the voucher includes transferring ownership to the redeeming retailer during the point of sale. If the recipient has no interest in the specific market associated with the IGV, they have the option to transfer it to another recipient or donate it to a charity/nonprofit related to the industry.

For the retailer: Participating in the IGV management system enhances visibility for retailers by placing them alongside their market peers as part of a larger fence network. Retailers agree to discount a sale up to the value of the IGV in exchange for ownership of the voucher. Once transferred, the IGV becomes fully owned by the retailer, including any remaining value unused by the recipient. Retailers may also utilize the IGV as a payment option for other organizations within the fence network. Additionally, retailers have the option to sell the IGV back to the IGV producer, who buys back valid IGVs at their face value and provides an additional predetermined monetary incentive to offset any associated cash-out fees. This offers retailers a chance to commodify IGVs and provides smaller fence links with an opportunity that was previously unavailable.

For regulators: The IGV management system may assist regulators in keeping controlled items within legal and regulated systems. Participating retailers must be licensed businesses in their operating areas, ensuring the exclusion of black and grey markets from the program. The system also ensures that recipients are subject to the retailer's age verification processes, already established and sanctioned by regulatory authorities. Moreover, IGVs may be utilized as a spending distribution tool to promote growth within specific industries as deemed appropriate by local, state, and federal governments. For example, in an Energy IGV scenario, IGVs could be employed by government agencies to assist low-income residents in paying their electric or gas bills. With a set expiration date, IGVs ensure that all associated funds circulate back into the economy.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 18:
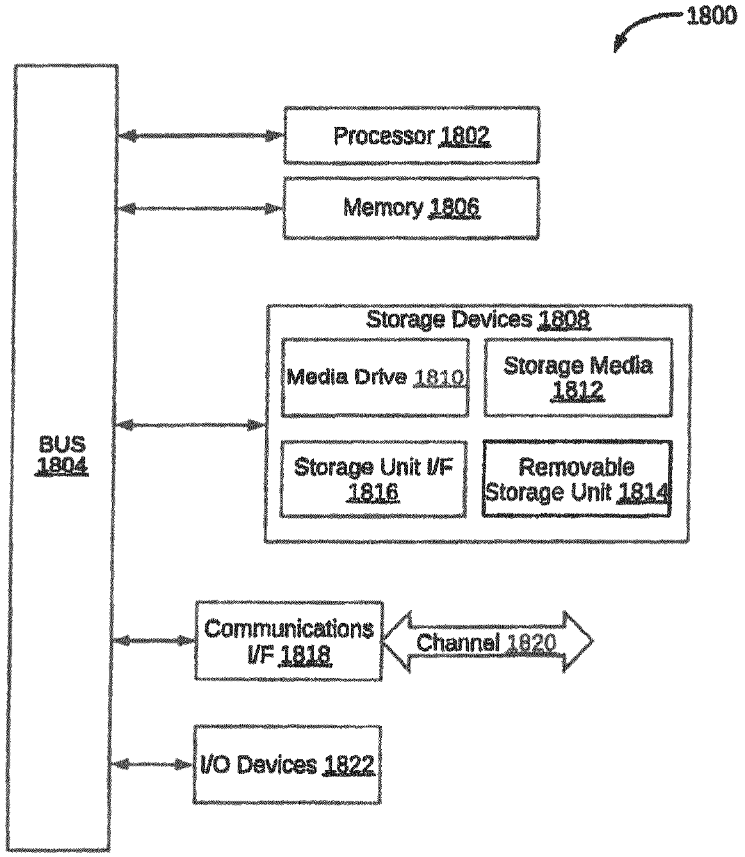
FIG. 18 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 18, an exemplary computing system 900 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 900 may represent, for example, a user device such as a desktop, a laptop, a mobile phone, personal entertainment device, DVR, and so on, or any other type of special or general-purpose computing device as may be desirable or appropriate for a given application or environment. The computing system 1800 may include one or more processors, such as a processor 1802 that may be implemented using a general or special purpose processing engine such as, for example, a microprocessor, microcontroller, or other control logic. In this example, the processor 902 is connected to a bus 1804 or other communication medium. In some embodiments, the processor 1802 may be an Artificial Intelligence (AI) processor, which may be implemented as a Tensor Processing Unit (TPU), or a graphical processor unit, or a custom programmable solution Field-Programmable Gate Array (FPGA).

The computing system 1800 may also include a memory 1806 (main memory), for example, Random Access Memory (RAM) or other dynamic memory, for storing information and instructions to be executed by the processor 1802. The memory 906 also may be used for storing temporary variables or other intermediate information during execution of instructions to be executed by the processor 1802. The computing system 1800 may likewise include a read only memory ("ROM") or other static storage device coupled to bus 904 for storing static information and instructions for the processor 1802.

The computing system 1800 may also include a storage device 1808, which may include, for example, a media drive 1810 and a removable storage interface. The media drive 1810 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 1812 may include, for example, a hard disk, magnetic tape, flash drive, or other fixed or removable medium that is read by and written to by the media drive 1810. As these examples illustrate, the storage media 1812 may include a computer-readable storage medium having stored therein particular computer software or data.

In alternative embodiments, the storage devices 908 may include other similar instrumentalities for allowing computer programs or other instructions or data to be loaded into the computing system 1800. Such instrumentalities may include, for example, a removable storage unit 1814 and a storage unit interface 1816, such as a program cartridge and cartridge interface, a removable memory (for example, a flash memory or other removable memory module) and memory slot, and other removable storage units and interfaces that allow software and data to be transferred from the removable storage unit 1814 to the computing system 1800.

The computing system 1800 may also include a communications interface 1818. The communications interface 1818 may be used to allow software and data to be transferred between the computing system 900 and external devices. Examples of the communications interface 1818 may include a network interface (such as an Ethernet or other NIC card), a communications port (such as for example, a USB port, a micro-USB port), Near field Communication (NFC), etc. Software and data transferred via the communications interface 1818 are in the form of signals which may be electronic, electromagnetic, optical, or other signals capable of being received by the communications interface 1818. These signals are provided to the communications interface 1818 via a channel 1820. The channel 1820 may carry signals and may be implemented using a wireless medium, wire or cable, fiber optics, or other communications medium. Some examples of the channel 1820 may include a phone line, a cellular phone link, an RF link, a Bluetooth link, a network interface, a local or wide area network, and other communications channels.

The computing system 1800 may further include Input/Output (I/O) devices 1822. Examples may include, but are not limited to a display, keypad, microphone, audio speakers, vibrating motor, LED lights, etc. The I/O devices 1822 may receive input from a user and also display an output of the computation performed by the processor 1802. In this document, the terms "computer program product" and "computer-readable medium" may be used generally to refer to media such as, for example, the memory 1806, the storage devices 1808, the removable storage unit 1814, or signal(s) on the channel 1820. These and other forms of computer-readable media may be involved in providing one or more sequences of one or more instructions to the processor 1802 for execution. Such instructions, generally referred to as "computer program code" (which may be grouped in the form of computer programs or other groupings), when executed, enable the computing system 1800 to perform features or functions of embodiments of the present invention.

In an embodiment where the elements are implemented using software, the software may be stored in a computer-readable medium and loaded into the computing system 1800 using, for example, the removable storage unit 1814, the media drive 1810 or the communications interface 1818. The control logic (in this example, software instructions or computer program code), when executed by the processor 1802, causes the processor 1802 to perform the functions of the invention as described herein.

Figure 19:
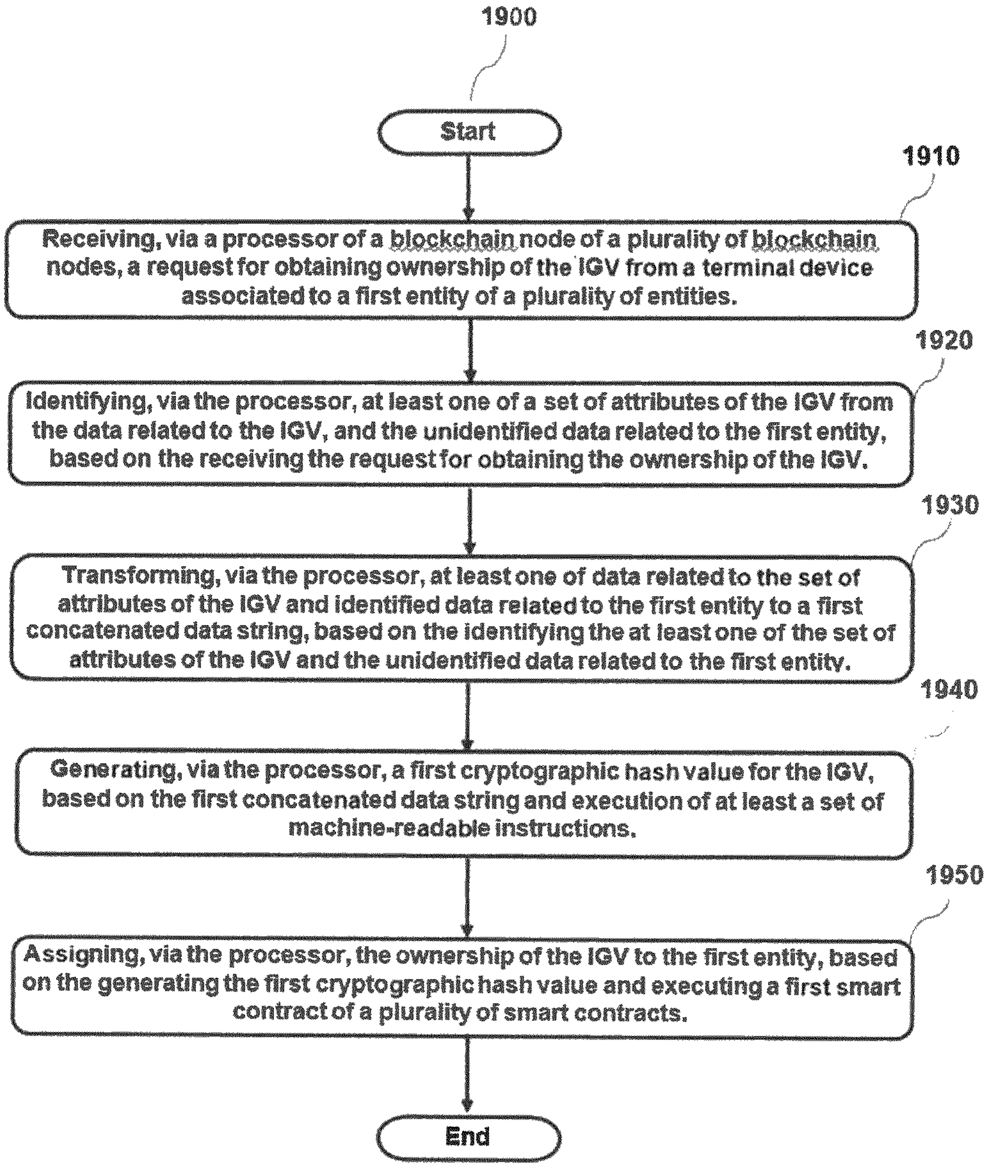
FIG. 19 illustrates a flow diagram of a method for secure transaction processing of an Industry Gift Voucher (IGV) in a blockchain network, in accordance with an embodiment of the present subject matter.

In an embodiment, referring to FIG. 19, a method (1900) for secure transaction processing of an Industry Gift Voucher (IGV) in a blockchain network is shown.

The order in which the method (1900) for secure transaction processing of an Industry Gift Voucher (IGV) in a blockchain network is described is not intended to be construed as a limitation, and any number of the described method blocks may be combined/performed in any order, repetitively, iteratively or simultaneously to implement the method (1900) or alternate methods. Additionally, individual blocks may be deleted from the method (1900) without departing from the spirit and scope of the subject matter described herein. Further, the method (1900) may be implemented in any suitable hardware, software, firmware, or combination thereof.

At step 1910, the method (1900) provides receiving, via a processor of a blockchain node of a plurality of blockchain nodes, a request for obtaining ownership of the IGV from a terminal device associated to a first entity of a plurality of entities. It is to be noted that the request includes unidentified data related to the first entity and data related to the IGV.

At step 1920, the method (1900) provides identifying, via the processor, at least one of a set of attributes of the IGV from the data related to the IGV, and the unidentified data related to the first entity on the basis of the received request for obtaining the ownership of the IGV.

At step 1930, the method (1900) provides transforming, via the processor, at least one of data related to the set of attributes of the IGV and identified data related to the first entity to a first concatenated data string on the basis of identification of the at least one of the set of attributes of the IGV and the unidentified data related to the first entity.

At step 1940, the method (1900) provides generating, via the processor, a first cryptographic hash value for the IGV on the basis of the first concatenated data string and execution of at least a set of machine-readable instructions.

At step 1950, the method (1900) provides assigning, via the processor, the ownership of the IGV to the first entity on the basis of the generating the first cryptographic hash value and executing a first smart contract of a plurality of smart contracts.

More specifically, with regard to the aforesaid embodiment, the present invention provides a method (1900) for secure transaction processing of an Industry Gift Voucher (IGV) in a blockchain network, ensuring enhanced security, authenticity, traceability, and prevention of fraudulent activities associated with the ownership assignment of the IGV.

The invention utilizes a blockchain infrastructure comprising a plurality of blockchain nodes, where each node includes a processor configured to execute a set of machine-readable instructions for enabling secure and verifiable transactions associated with the IGV. The blockchain nodes may include, but are not limited to, full nodes running on enterprise-grade servers, validator nodes operating in proof-of-stake (PoS) systems, or consortium nodes within a permissioned network. These nodes may be hosted by participating entities such as voucher issuers, authorized businesses within a fence network, or third-party service providers.

Further, a terminal device refers to any computing or communication device capable of initiating a request to interact with the blockchain system. This may include, for example, a user's smartphone running a digital wallet application, a merchant's point-of-sale (POS) terminal, a web-based user interface, or an enterprise-issued digital dashboard configured to generate or redeem IGVs.

Initially, a terminal device associated with a first entity (for example, a user intending to own or purchase the IGV) transmits a request to obtain ownership of the IGV to a blockchain node. The request includes data related to the IGV, such as a voucher identifier, voucher value, expiry details, or any additional metadata, along with unidentified data related to the first entity, such as a unique reference, anonymous identifier, or encrypted user-specific details to maintain privacy.

Upon receiving the request, the processor of the blockchain node identifies at least one of a set of attributes of the IGV and data related to the first entity. The identification process ensures that sensitive attributes related to both the IGV and the requesting entity are captured and prepared for subsequent validation and verification.

To enhance security and ensure non-repudiation, the processor transforms the identified data related to the IGV and the first entity into a first concatenated data string. This concatenated data string represents a unique combination of the IGV details and the first entity's information, ensuring that the subsequent hash generation is unique to this particular transaction event and ownership transfer.

Subsequently, the processor generates a first cryptographic hash value corresponding to the IGV based on the first concatenated data string. The generation of the cryptographic hash is achieved through the execution of a set of machine-readable instructions implementing a collision-resistant hash function. The collision-resistant nature of the hash function ensures that any two different combinations of IGV data and entity data will produce distinct hash values, thereby preventing fraudulent duplication or unauthorized modification of voucher-related information.

The generated first cryptographic hash value, along with the data related to the set of attributes of the IGV and the identified data related to the first entity, is securely stored on a blockchain ledger. Since the blockchain ledger is distributed across the plurality of blockchain nodes, any data recorded therein is immutable, tamper-resistant, and verifiable by all authorized nodes within the network.

Further, the ownership of the IGV is assigned to the first entity by executing a first smart contract, which is one of a plurality of smart contracts stored on the blockchain ledger. The execution of the smart contract enables automatic validation of the authenticity of the generated cryptographic hash value by retrieving the same from the blockchain ledger and performing a subsequent comparison with the corresponding IGV attributes and first entity data.

Upon successful validation, the smart contract facilitates the assignment of ownership of the IGV to the first entity and records the ownership information in real-time on the blockchain ledger. Importantly, the recorded ownership information is immutable and securely verifiable at any subsequent stage using the generated cryptographic hash value. This ensures that ownership details cannot be tampered with or modified by any unauthorized entity, thereby enhancing trust, transparency, and security within the IGV transaction ecosystem.

The present invention thus provides a technically advanced and highly secure mechanism for transaction processing of IGVs in a blockchain network. It eliminates the reliance on traditional centralized systems prone to fraud, unauthorized access, or data manipulation. The invention leverages the distributed nature of blockchain, cryptographic hashing, and smart contracts to provide traceability, data integrity, and real-time validation for IGV ownership transactions.

Figure 20:
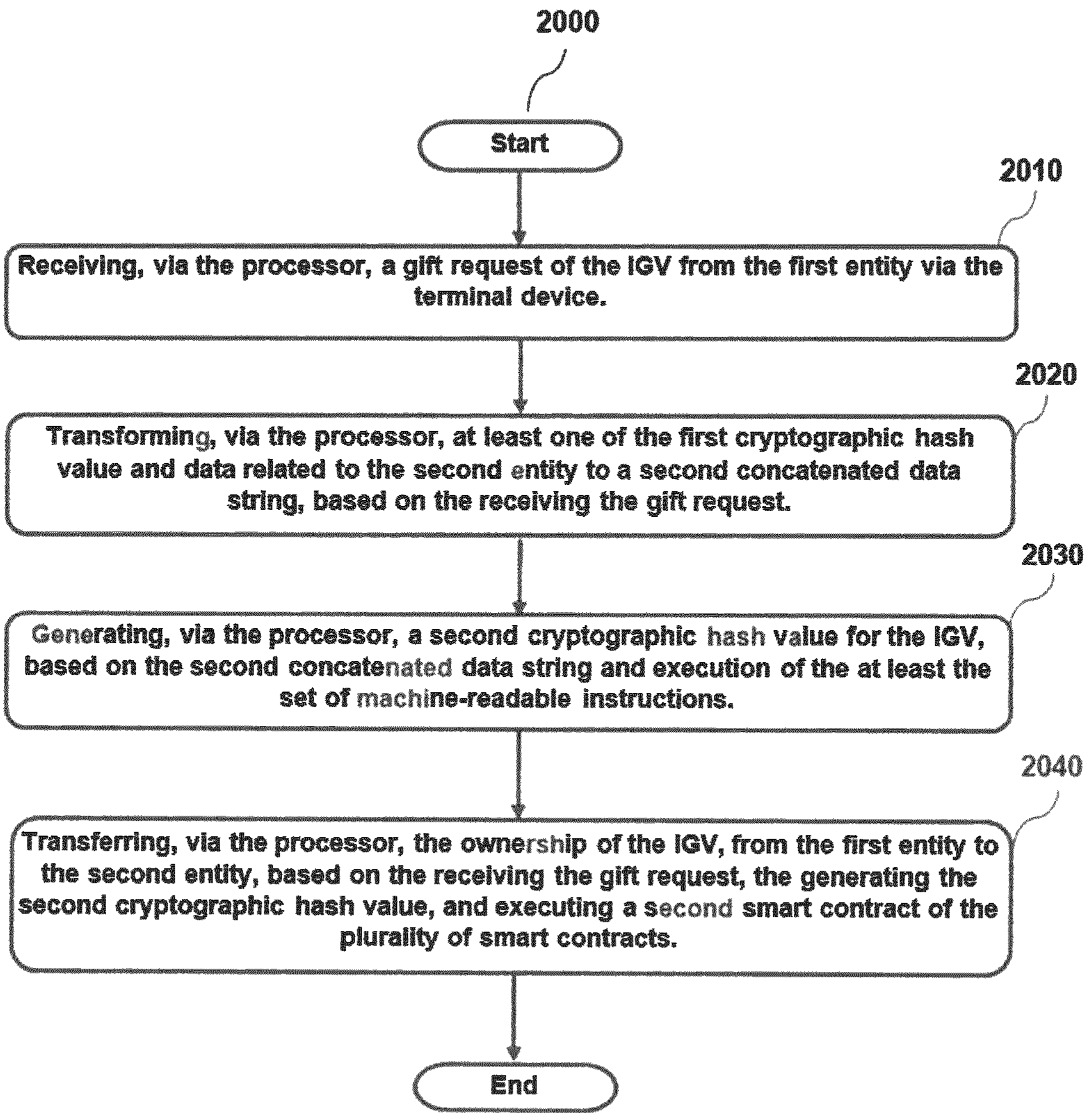
FIG. 20 illustrates a flow diagram of a method for secure transaction processing of an Industry Gift Voucher (IGV) in a blockchain network, in accordance with an embodiment of the present subject matter.

In an embodiment, referring to FIG. 20, a method (2000) for secure transaction processing of an Industry Gift Voucher (IGV) in a blockchain network is shown.

The order in which the method (2000) for secure transaction processing of an Industry Gift Voucher (IGV) in a blockchain network is described is not intended to be construed as a limitation, and any number of the described method blocks may be combined/performed in any order, repetitively, iteratively or simultaneously to implement the method (2000) or alternate methods. Additionally, individual blocks may be deleted from the method (2000) without departing from the spirit and scope of the subject matter described herein. Further, the method (2000) may be implemented in any suitable hardware, software, firmware, or combination thereof.

At step 2010, the method (2000) provides receiving, via the processor, a gift request of the IGV from the first entity via the terminal device. It is to be noted that the gift request corresponds to transfer of the ownership of the IGV from the first entity to a second entity of the plurality of entities.

At step 2020, the method (2000) provides transforming, via the processor, at least one of the first cryptographic hash value and data related to the second entity to a second concatenated data string on the basis of the received gift request.

At step 2030, the method (2000) provides generating, via the processor, a second cryptographic hash value for the IGV on the basis of the second concatenated data string and execution of the at least the set of machine-readable instructions.

At step 2040, the method (2000) provides transferring, via the processor, the ownership of the IGV, from the first entity to the second entity on the basis of the received gift request, the generated second cryptographic hash value, and executing a second smart contract of the plurality of smart contracts.

More specifically, with regard to the aforesaid embodiment, the disclosed method (2000) is extended to include a secure and verifiable mechanism for the transfer of IGV ownership from a first entity to a second entity, such as in the case of gifting an IGV.

Upon successful assignment of the IGV to the first entity and recording of the ownership information on the blockchain ledger, the method enables the first entity to initiate a gift request via a terminal device, such as a computing device, a communication device, a mobile wallet, a web application, or a merchant interface. The gift request represents an intention to transfer ownership of the IGV to a second entity and includes relevant data such as the unique identifier of the IGV, recipient details, and confirmation from the first entity authorizing the transfer.

The processor of a blockchain node receives the gift request from the terminal device associated with the first entity. In response to the received request, the processor transforms at least one of the first cryptographic hash value (associated with the first entity's ownership of the IGV) and data related to the second entity (e.g., the second entity's anonymous identifier, wallet address, or registered credentials) into a second concatenated data string. This data string effectively links the previous ownership record with the intended recipient, forming the basis for the next cryptographic validation.

The processor then generates a second cryptographic hash value based on the second concatenated data string, by executing at least a portion of the same set of machine-readable instructions used for hash generation in the earlier ownership assignment phase. As with the first hash value, the hash function applied here is collision-resistant, ensuring that every IGV transfer generates a distinct and verifiable record, even if the same IGV is repeatedly gifted among different users.

The newly generated second cryptographic hash value and the data related to the second entity are then stored on the blockchain ledger, where they become part of the immutable transaction history of the IGV. This stored data serves as a permanent and tamper-proof record of the transfer event.

Ownership of the IGV is transferred from the first entity to the second entity by executing a second smart contract, selected from the plurality of smart contracts stored on the blockchain ledger. The second smart contract is configured to automatically:

- Retrieve the second cryptographic hash value from the blockchain ledger;
- Validate the authenticity of the transaction by comparing the second cryptographic hash value with one or more of the following:
  - The first cryptographic hash value (to ensure continuity in the transaction chain),
  - The data related to the set of attributes of the IGV (to verify that the voucher remains unchanged),
  - The data related to the first entity (the current owner), and/or
  - The data related to the second entity (the intended recipient).

This multi-factor validation ensures that the IGV transfer is genuine, authorized, and compliant with transaction policies set within the smart contract. Only if the verification process passes all conditions does the smart contract proceed to update the ownership record on the blockchain ledger in real time.

Once updated, the ledger reflects that the second entity is the new and rightful owner of the IGV. Because this information is immutably stored and linked via both cryptographic hashes, any future action on the same IGV—whether transfer, redemption, or audit—can be transparently and securely validated by any authorized party within the blockchain network.

This aspect of the invention provides a technically robust and fraud-resistant solution for gift-based IGV transfers. It eliminates the need for manual authorization, prevents unauthorized reissuance or redemption, and ensures non-repudiation through immutable and verifiable transaction records. The use of sequential cryptographic hashes linked to smart contract-based verification enforces strict traceability and integrity of IGV ownership transitions.

Figure 21:
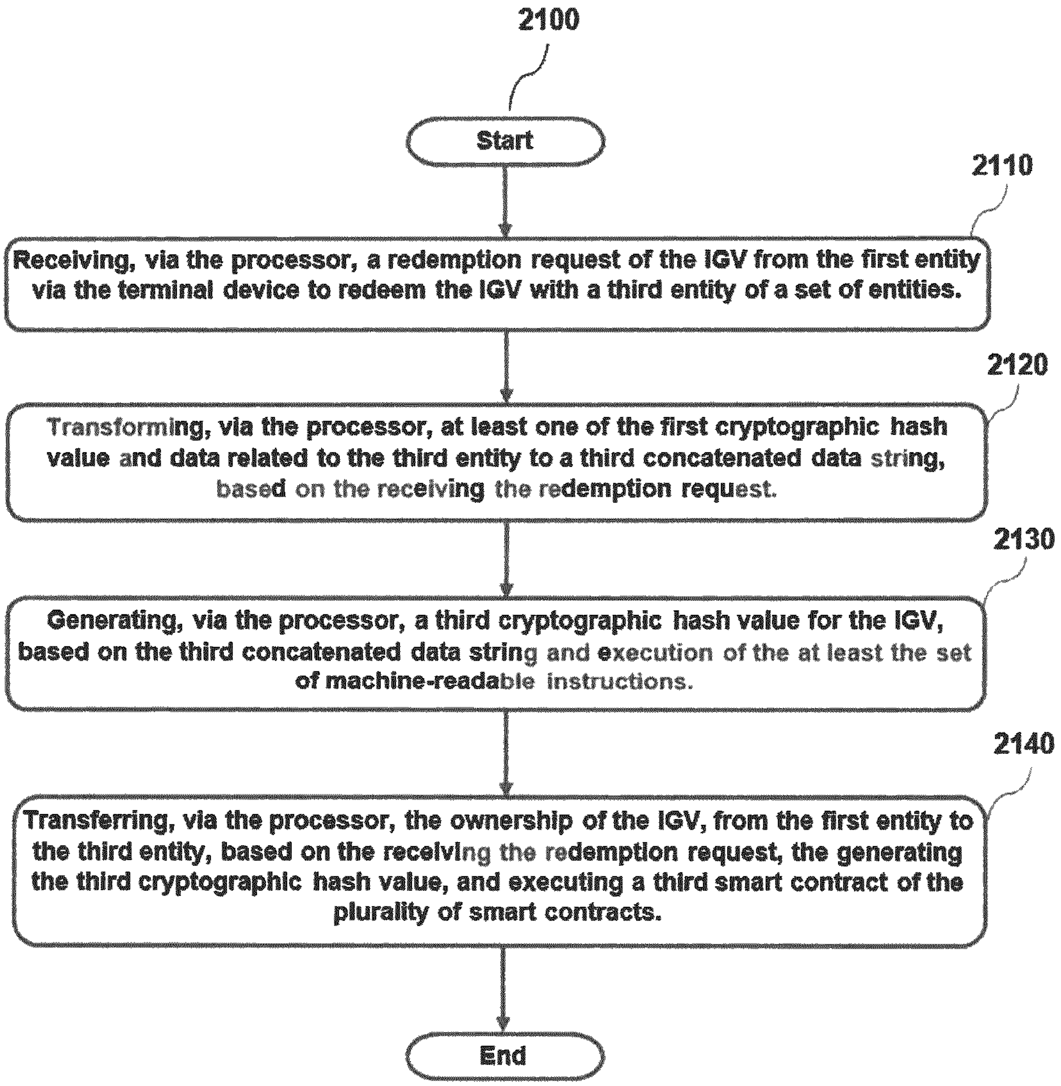
FIG. 21 illustrates a flow diagram of a method for secure transaction processing of an Industry Gift Voucher (IGV) in a blockchain network, in accordance with an embodiment of the present subject matter

In an embodiment, referring to FIG. 21, a method (2100) for secure transaction processing of an Industry Gift Voucher (IGV) in a blockchain network is shown.

The order in which the method (2100) for secure transaction processing of an Industry Gift Voucher (IGV) in a blockchain network is described is not intended to be construed as a limitation, and any number of the described method blocks may be combined/performed in any order, repetitively, iteratively or simultaneously to implement the method (2100) or alternate methods. Additionally, individual blocks may be deleted from the method (2100) without departing from the spirit and scope of the subject matter described herein. Further, the method (2100) may be implemented in any suitable hardware, software, firmware, or combination thereof.

At step 2110, the method (2100) provides receiving, via the processor, a redemption request of the IGV from the first entity via the terminal device to redeem the IGV with a third entity of a set of entities. It should be noted that the set of entities of the plurality of entities is associated to a fence network and data related to the set of entities is stored on the blockchain ledger.

At step 2120, the method (2100) provides transforming, via the processor, at least one of the first cryptographic hash value and data related to the third entity to a third concatenated data string on the basis of the received redemption request.

At step 2130, the method (2100) provides generating, via the processor, a third cryptographic hash value for the IGV on the basis of the third concatenated data string and execution of the at least the set of machine-readable instructions.

At step 2140, the method (2100) provides transferring, via the processor, the ownership of the IGV, from the first entity to the third entity on the basis of the received redemption request, the generated third cryptographic hash value, and executing a third smart contract of the plurality of smart contracts.

More specifically, with regard to the aforesaid embodiment, the disclosed method (2100) provides a secure mechanism for the redemption of an Industry Gift Voucher (IGV) by a first entity through a third entity, where the third entity is part of a predefined and permissioned group of entities referred to as a fence network. This ensures that redemptions are limited to authorized enterprises, thereby preventing misuse and enforcing commercial boundaries.

After the ownership of the IGV has been assigned to the first entity, the first entity may choose to redeem the IGV through a third entity (e.g., a participating store, hotel, or service provider). To initiate this process, the first entity submits a redemption request via a terminal device, such as a computing device, a communication device, a mobile app, a web platform, or an integrated retail kiosk.

The processor of a blockchain node receives the redemption request, which includes the identity of the third entity and references the IGV that is to be redeemed. The third entity must be one of a set of entities associated with a fence network, which may represent a closed-loop ecosystem of participating businesses. The data related to this set of authorized entities (i.e., the fence network) is pre-stored on the blockchain ledger, allowing on-chain verification during the redemption process.

To ensure secure and traceable redemption, the processor transforms at least one of the first cryptographic hash value and data related to the third entity into a third concatenated data string. This transformation serves to bind the redemption action to the original IGV record and the target entity attempting to redeem the voucher.

Based on this third concatenated data string, the processor generates a third cryptographic hash value by executing a portion of the same set of machine-readable instructions used in the creation and transfer phases. The third cryptographic hash value serves as a unique digital fingerprint of the redemption event and is subsequently stored on the blockchain ledger, thereby preserving a permanent record of the redemption attempt.

To facilitate the actual transfer of the IGV upon redemption, a third smart contract—selected from the plurality of smart contracts stored on the blockchain ledger—is executed by the processor. This smart contract is responsible for:

Verifying Redemption Validity:

The smart contract checks whether the IGV has already been redeemed, using data recorded on the blockchain ledger (e.g., a redemption status flag or history of ownership transfers). This step prevents double-spending or re-use of the same IGV, which is critical in environments involving real monetary or commercial value.

Verifying Entity Authorization via Fence Network Mapping:

The smart contract maps the identity of the third entity (i.e., the redemption point) to the pre-registered set of entities associated with the fence network, as stored on the blockchain ledger. Only if the third entity is found within this set is the redemption permitted. This mapping step enforces network-level access control, ensuring that redemptions cannot occur through unauthorized or non-participating vendors.

Validating Redemption Integrity via Hash Comparison:

Following network authorization, the smart contract retrieves the third cryptographic hash value from the blockchain ledger and performs a comparison with at least one of:

The first cryptographic hash value (i.e., initial voucher issuance),

The data related to the set of attributes of the IGV (e.g., value, ID, expiration), The data related to the first entity (current holder), and/or The data related to the third entity (redemption point).

This multi-factor validation step ensures the authenticity, consistency, and legitimacy of the redemption request, mitigating the risk of forged or manipulated inputs.

Once all validations pass, the third smart contract transfers ownership of the IGV to the third entity (for audit and closing purposes), and in real-time, updates the blockchain ledger to reflect:

The transfer of ownership, and

The redemption status of the IGV, effectively marking it as redeemed and preventing any future reuse.

This mechanism ensures a secure, rule-enforced, and fully auditable redemption process, bringing significant technical improvements over conventional systems, which often rely on centralized validation, manual reconciliation, or static blacklists.

Through the application of blockchain technology, cryptographic hashing, and permissioned smart contracts, the present invention ensures that only authorized entities within the fence network can redeem vouchers, thereby protecting value, enforcing business rules, and enabling scalable, trustless operations across a multi-entity ecosystem.

In an embodiment, the present invention provides for a mechanism by which transaction-related information, particularly concerning changes in ownership of an Industry Gift Voucher (IGV), is communicated to a terminal device in real time. This enhancement ensures transparency, immediate user feedback, and an interactive experience throughout the lifecycle of the IGV.

Following the successful execution of a smart contract that results in a change in IGV ownership—such as the gifting process described in earlier embodiments—the processor of a blockchain node is configured to detect the corresponding update recorded on the blockchain ledger. Upon detecting this change, the processor transmits transaction information to the terminal device associated with the relevant entity, such as the receiving user or second entity in the transfer.

The transaction information includes details reflective of the updated ownership status of the IGV, such as the new owner's identifier, a reference to the executed transaction, timestamps, and other metadata linked to the change. This information may be encapsulated in a response payload or relayed through blockchain middleware or user-facing interfaces integrated with the terminal device. The system is designed to ensure that this transmission occurs in real time, thereby minimizing delay between blockchain-level transaction finalization and user-level awareness of the update.

In response to the received transaction information, the processor further controls the terminal device to display, via an integrated display device, the updated ownership information of the IGV. This may be implemented through a graphical user interface that reflects the new state of the voucher, such as a digital card or voucher certificate view, including an acknowledgment or confirmation that the IGV has been successfully transferred. In some configurations, the terminal device may present a visual confirmation such as a success message, an updated ownership badge, or a QR code representing the voucher under its new owner.

This real-time display and synchronization capability improves both transparency and trust in the transaction process. It allows the involved entities to independently verify that the transfer of ownership has occurred and that the blockchain ledger reflects this new state without relying on external confirmation or manual refresh. Furthermore, the user interface layer becomes a verifiable point of reference for end-users, directly connected to the immutable data recorded on the blockchain. This ensures consistency between the ledger and what is presented to the user, thereby mitigating confusion, uncertainty, or fraud.

Overall, this feature of the present invention provides a technically advantageous integration of blockchain transaction processing with real-time, user-facing interactivity, bridging the backend logic of smart contracts with front-end confirmation, and thereby enhancing the overall reliability and usability of the IGV management system.

In an embodiment, the present invention provides a mechanism to ensure the uniqueness of the cryptographic hash value generated for an Industry Gift Voucher (IGV), thereby preventing any risk of hash collision, redundancy, or conflict within the blockchain ledger. This feature significantly enhances the system's reliability, data integrity, and resistance to fraudulent duplication.

As described previously, when an IGV is created and ownership is requested by a first entity, the system generates a first cryptographic hash value using a collision-resistant hashing algorithm based on a concatenated data string derived from attributes of the IGV and the identifying information of the first entity. However, in rare or theoretically possible cases where the same hash value is produced more than once—known as a hash collision—the processor implements a verification process to ensure that the generated hash is indeed unique across all existing hash values stored on the blockchain ledger.

Upon generating the first cryptographic hash value, the processor performs a search or comparison against the blockchain ledger's existing hash records to determine whether the generated hash value has been previously assigned to any other IGV. This verification may involve querying indexed hash mappings, cross-referencing recent blocks, or interacting with consensus-maintained registries.

If the hash value is found to be unique, the system proceeds with storing the associated data and assigning ownership as per earlier embodiments.

However, if the hash value is determined to be non-unique or duplicate, the processor initiates a re-generation routine. This routine modifies one or more elements of the original concatenated data string—such as appending a nonce, timestamp, or an additional entropy source—and then re-executes the hash function to produce a new cryptographic hash value. This re-generated hash is then subjected to the same uniqueness verification check. The process may repeat iteratively until a verified unique hash value is produced.

This step of verifying hash uniqueness and re-generating as needed provides a critical technical safeguard within the IGV blockchain system. It ensures that every IGV recorded on the ledger has a distinct and non-repeating digital fingerprint, which serves as the basis for transaction validation, ownership authentication, and system-wide traceability. The uniqueness of the hash value also plays an important role in smart contract execution, as it eliminates the possibility of logical ambiguity or transaction misidentification due to hash duplication.

By integrating this layer of uniqueness enforcement at the hash generation stage, the present invention introduces a robust improvement over conventional systems, which may assume, but do not validate, the uniqueness of identifier hashes. This enhancement ultimately contributes to the immutability, integrity, and operational trustworthiness of the blockchain-based IGV issuance and management framework.

In an embodiment, the present invention further defines the structure of the data related to the set of attributes of the Industry Gift Voucher (IGV), which are integral to the hash generation, validation, and overall transaction processing within the blockchain network.

The data related to the set of attributes of the IGV comprises at least one of the following: a base value, an expiration date, a creation timestamp, a unique transaction identifier, or a previous hash. These attributes, either individually or in combination, contribute to the uniqueness, traceability, and lifecycle enforcement of the IGV.

The base value refers to the monetary or redeemable value assigned to the IGV at the time of creation. This value may represent a fixed denomination (e.g., $50) or a variable credit amount and is essential for validating transactions involving redemption or partial usage. Embedding the base value within the voucher metadata allows smart contracts to validate usage conditions, apply limits, or calculate balance in scenarios involving multiple partial redemptions.

The expiration date defines the temporal validity of the IGV and ensures that the voucher cannot be redeemed beyond a predetermined period. This attribute is particularly useful for implementing rules around voucher validity, enforcement of promotional windows, and automatic invalidation by the smart contract logic if a redemption request occurs beyond the permitted timeframe.

The creation timestamp provides an immutable record of when the IGV was originally issued. This timestamp can be used in conjunction with the expiration date to enforce duration-based policies, trace issuance events, and support analytics around issuance trends and system activity over time.

The unique transaction identifier is a system-generated or blockchain-native identifier that links the IGV to the specific transaction in which it was created. This ensures that each IGV is uniquely associated with a recorded event in the blockchain ledger, allowing for end-to-end traceability and facilitating dispute resolution or auditing if needed.

The previous hash refers to the cryptographic hash value of a prior IGV-related transaction (e.g., creation or transfer), which may be used to build a chained reference model. Including the previous hash enhances the tamper-resistance and structural integrity of the IGV's lifecycle by ensuring that each state of the voucher (creation, transfer, redemption) maintains a verifiable link to its predecessor.

By incorporating these data elements into the IGV metadata stored and hashed within the blockchain ledger, the system ensures a high degree of granularity and verifiability. Each attribute plays a role in uniquely identifying the IGV, enforcing business logic, and enabling secure, rule-based automation through smart contracts. This comprehensive approach provides a technical advantage over traditional systems that rely on opaque or centralized data stores, lacking both transparency and immutability.

In an embodiment, the present invention further provides that the data related to at least one entity of the plurality of entities participating in the blockchain-based IGV transaction system includes at least one of the following: corresponding entity details, entity's account information, or proof of licenses or certifications stored on the blockchain ledger.

The corresponding entity details refer to identifying metadata for each participating user or organization involved in the IGV lifecycle, including, for example, a unique user ID, enterprise registration number, name, or associated blockchain wallet address. This information serves as the basis for ownership assignments, transaction tracking, and user interface rendering, enabling entities within the network to be individually recognized, authenticated, and audited.

The entity's account information may include blockchain wallet credentials, public keys, or linked account identifiers that allow the system to associate transactions with specific blockchain actors securely. Such information is essential for cryptographic verification and signature validation during smart contract execution, ensuring that only the rightful entity can initiate or approve actions such as claiming ownership, transferring, or redeeming an IGV. Storing account-level data on-chain also supports secure referencing during conflict resolution or transaction rollback scenarios, without needing off-chain dependencies.

The proof of licenses or certifications pertains to formal documentation or digital attestations that validate an entity's eligibility or compliance with operational rules within the IGV ecosystem. For example, a third entity authorized to redeem IGVs within a fence network may be required to store proof of a business license, regulatory certification, or participation agreement on the blockchain ledger. This data enables automated smart contract-based validation before permitting redemption, thereby enforcing policy without manual review or external intervention.

The presence of these data types on the blockchain ledger ensures end-to-end verifiability, security, and transparency for every entity-related transaction. It enhances the robustness of the system by allowing real-time authentication, permission-based control, and tamper-proof status verification, all within the decentralized infrastructure.

This approach provides a significant technical improvement over traditional systems, which typically rely on off-chain user databases or third-party validation mechanisms that introduce points of failure and inefficiency. By decentralizing the storage and validation of entity data, the present invention enables a more secure, streamlined, and trustless transaction environment for Industry Gift Voucher issuance, transfer, and redemption.

In an embodiment, the present invention employs a secure, cryptographic hashing algorithm, specifically a variant conforming to the SHA-256 (Secure Hash Algorithm 256-bit) standard, for generating the first cryptographic hash value, second cryptographic hash value, and third cryptographic hash value associated with an Industry Gift Voucher (IGV). This ensures that the voucher's digital representation on the blockchain ledger remains secure, tamper-evident, and uniquely identifiable.

The SHA-256 algorithm is a well-established, collision-resistant hash function capable of generating a 256-bit output that serves as a unique digital fingerprint for a given input. In the context of this invention, the input typically comprises a concatenated data string derived from the IGV's attributes and entity information, as previously described. The cryptographic strength of SHA-256 ensures that even a minor change in input data—such as a different expiration date or user ID—will result in an entirely different hash output. This property inherently mitigates the risk of hash collisions, thereby ensuring that every IGV maintains a distinct and verifiable hash representation.

Further, in one embodiment, the first cryptographic hash value generated by the processor is structured to exhibit a hierarchical format, enabling modular, layered referencing of voucher data components. In such a structure, sub-hash components may be computed individually for different data segments (e.g., one for IGV metadata, one for entity identity, and one for previous transaction linkage), and then combined to form the final SHA-256 hash. This modularity allows for more fine-grained validation, traceability, and computational optimization when verifying specific aspects of the IGV without requiring a complete recomputation of the entire data set.

The ownership information recorded on the blockchain ledger is directly linked to this first cryptographic hash value. Upon querying or executing a smart contract, the processor or contract logic can retrieve the hash value from the ledger and use it as a unique, tamper-proof key to validate the integrity and ownership history of the IGV. If the hash does not match the expected recomputed hash based on the current state of the IGV and associated entity, the system can immediately identify a discrepancy and reject the transaction, thus ensuring the authenticity and integrity of voucher ownership.

This approach provides a technological improvement over traditional centralized systems, which may use simple identifiers or rely on mutable, database-bound metadata without cryptographic guarantees. By incorporating SHA-256 hashing in a structured, verifiable manner, the invention ensures that each IGV remains securely linked to its rightful owner and its transaction history can be immutably traced and validated throughout its lifecycle in the blockchain environment.

In an embodiment of the invention, the Industry Gift Voucher (IGV) is not only a token of value used for promotional or transaction purposes but also represents a predetermined incentive that is securely backed by a blockchain network-based collateral account. This implementation enhances the functional value of the IGV by ensuring that each voucher is tied to a verifiable and enforceable incentive reserve, which can be programmatically disbursed to a recipient entity upon successful redemption.

The predetermined incentive may take the form of a fixed monetary amount, a credit token, or a redeemable resource or service unit, depending on the industry or context in which the IGV is issued. This incentive is pre-allocated at the time of voucher creation and is stored or referenced through a collateral account maintained on the blockchain network. The collateral account may be configured as a smart contract-managed wallet or reserve pool, from which funds or credits are released only when pre-specified contractual conditions are met.

When the IGV is redeemed by a first entity through a third entity—such as a merchant or service provider authorized within the fence network—the system executes at least one smart contract of the plurality of smart contracts to facilitate the transfer of the predetermined incentive. The smart contract validates the redemption, verifies that the IGV has not been previously redeemed, confirms the association of the third entity with the permitted redemption network, and then initiates the disbursement of the incentive.

Upon successful verification, the smart contract is triggered to release the incentive value from the blockchain-based collateral account to the third entity, typically by transferring tokens, assets, or digital credits to the blockchain wallet or address registered to the third entity. This automatic transfer ensures that the redemption is not only validated but also rewarded or settled in real-time, without the need for manual settlement processes or off-chain reconciliation.

This incentive mechanism provides several technical advantages. First, it guarantees that every IGV is backed by a provable value at the time of issuance, reinforcing trust across all entities in the network. Second, it enables a transparent and auditable redemption trail, wherein the incentive movement is recorded immutably on the blockchain ledger. Third, the use of smart contracts eliminates administrative overhead by automating settlement and disbursement, significantly reducing the risk of error, delay, or fraud.

By integrating collateral-backed incentives into the IGV lifecycle and enabling conditional disbursement through smart contracts, the invention introduces a powerful improvement over traditional voucher systems that often rely on opaque or manual reimbursement processes. This feature ensures a frictionless, accountable, and programmable incentive delivery system, contributing to the broader goal of creating a secure, efficient, and scalable IGV transaction ecosystem.

In an embodiment of the invention, the hierarchical structure of the first cryptographic hash value generated during Industry Gift Voucher (IGV) issuance is implemented using a Merkle tree structure, which enhances the efficiency and reliability of data verification within the blockchain network.

A Merkle tree, also known as a hash tree, is a cryptographic data structure that enables large sets of data to be securely and efficiently verified through the use of a tree of hashes. In the context of the present invention, the various components of the IGV data—such as base value, expiration date, creation timestamp, unique transaction identifier, and any entity-related metadata—are first hashed individually to create leaf nodes of the Merkle tree.

These individual hashes are then recursively combined in pairs to generate intermediate parent hashes, until a single root hash is produced, representing the entire IGV data structure. This root hash serves as the first cryptographic hash value and is stored immutably on the blockchain ledger.

The use of a Merkle tree structure provides substantial technical advantages in terms of data integrity, scalability, and verification speed. Since only a portion of the tree needs to be recomputed or traversed during validation, the processor can efficiently verify whether a particular component of the IGV data—such as the base value or expiration date—matches the recorded hash without having to rehash the entire dataset. This partial proof verification greatly reduces computational overhead, particularly in scenarios involving bulk IGV processing or smart contract-driven comparisons.

Moreover, the Merkle root offers a compact and tamper-evident representation of the complete IGV data set. Any alteration to even a single attribute (such as a changed date or value) would result in a change in the corresponding leaf node hash and, consequently, the root hash. This ensures that any unauthorized modification to the voucher data can be immediately detected through root hash mismatch during smart contract validation or ledger querying.

By leveraging the Merkle tree structure, the invention thus introduces a highly efficient, secure, and modular approach to hash-based verification within a blockchain environment. This represents a significant improvement over flat, linear hashing methods used in conventional systems, where even minor changes require recomputation and revalidation of the entire data structure.

Through this architecture, the system not only preserves the cryptographic uniqueness of the IGV's digital representation but also enhances operational performance, especially in high-throughput environments or where layered data validation is critical to transaction integrity.

In an embodiment, the present invention incorporates a multi-signature authentication mechanism within the execution logic of each smart contract used to process IGV-related transactions on the blockchain network. This approach introduces an additional layer of security, decentralization, and consensus enforcement, particularly in critical transactions such as assigning or transferring the ownership of an Industry Gift Voucher (IGV).

As described earlier, the present invention utilizes a plurality of smart contracts stored on the blockchain ledger, each of which is configured to autonomously execute a respective transaction of a plurality of transactions within the IGV lifecycle. These transactions may include, but are not limited to, the initial assignment of IGV ownership to a first entity and the transfer of ownership from one entity to another, including gifting or redemption scenarios.

In this embodiment, each smart contract is configured to verify and authenticate a multi-signature approval prior to executing its respective transaction. The multi-signature approval is generated from a set of entities associated with the specific transaction. For example, in the case of assigning the IGV to a new user, the required set of signatures may include that of the voucher issuer and the recipient entity. In the case of transfer or redemption, the required signatories may include the current owner, the recipient, and a verifying authority within a fence network.

The multi-signature approval corresponds to a collective digital approval, received in the form of cryptographic signatures from each member of the designated set of entities. The signatures are typically generated using private keys associated with each participant's blockchain account, and then verified using corresponding public keys within the smart contract logic. Only after all required signatures have been authenticated does the smart contract proceed with executing the underlying transaction—whether it be ownership assignment, transfer, or redemption.

This multi-signature process ensures that no single entity can unilaterally initiate or complete a critical transaction involving an IGV. It enforces mutual consent, reduces the risk of unauthorized transfers, and strengthens the auditability and legitimacy of each operation within the IGV ecosystem. The system also enables programmable flexibility in defining which types of transactions require multi-signature approval and which entities are involved, depending on business rules or regulatory requirements.

By integrating multi-signature authentication into the smart contract workflow, the present invention achieves a significant technical improvement over conventional single-signature or manually approved systems. It automates the verification of consent across multiple stakeholders, ensures transparency in decision-making, and provides cryptographic proof of authorization for each recorded transaction on the blockchain ledger. This further reinforces the system's core attributes of security, decentralization, and trustless execution in the management of Industry Gift Vouchers.

In an embodiment, the present invention enhances the reliability and security of Industry Gift Voucher (IGV) transactions by enabling each smart contract of the plurality of smart contracts to perform timestamp validation and fraud detection before executing its respective transaction on the blockchain network. This functionality is critical for maintaining the authenticity, temporal consistency, and trustworthiness of each IGV operation within a decentralized system.

Each smart contract is configured to autonomously execute a respective transaction from a plurality of possible transactions, such as assigning ownership of an IGV, transferring ownership between entities, or redeeming the IGV within a fence network. Prior to executing the transaction logic, the smart contract retrieves and examines the timestamp associated with the transaction request, which may include the time of submission, time of receipt by the blockchain node, or a cryptographically bound creation timestamp included within the IGV metadata.

The timestamp validation serves multiple purposes. Firstly, it ensures that the transaction falls within an acceptable temporal window defined by system parameters, such as the valid lifespan of the IGV or predefined time limits for completing certain actions. Secondly, it prevents replay attacks, wherein an adversary might attempt to reuse previously valid transactions by resubmitting them at a later time. By checking the freshness and consistency of the timestamp, the smart contract can confirm that the transaction is timely, non-expired, and aligned with expected behavior.

In addition to timestamp validation, each smart contract also includes logic to detect potential indicators of fraud. This may include, for instance, checking for anomalies such as duplicate transaction attempts, mismatched entity signatures, tampered voucher values, or conflicting transaction histories. The smart contract may query the blockchain ledger to examine the current status of the IGV—whether it has already been redeemed, whether its value has been altered, or whether unauthorized entities are attempting to perform a restricted action.

By embedding such validation and detection mechanisms into the execution flow, the smart contract acts as an autonomous gatekeeper, capable of identifying and rejecting fraudulent or tampered transactions in real time without human intervention. If a transaction fails either the timestamp check or the fraud detection logic, the smart contract terminates execution and logs the event, thereby maintaining the integrity of the blockchain ledger and alerting relevant entities to the rejected attempt.

This approach represents a clear technical improvement over traditional systems, which typically rely on centralized fraud detection layers, delayed audits, or post-transactional reconciliation. By decentralizing timestamp verification and fraud screening into the smart contract layer, the present invention ensures that only valid, timely, and authentic transactions are permitted to modify the ledger or affect IGV ownership. As a result, the system offers enhanced trust, automation, and transactional security, critical to scalable and tamper-resistant voucher management in blockchain ecosystems.

In an embodiment, the present invention ensures secure and trustworthy control over which entities are permitted to participate in Industry Gift Voucher (IGV) redemption by associating each participating entity within the fence network with a validated, authorized membership. This membership data is securely stored on the blockchain ledger in encrypted form, and is used by the system to govern transaction eligibility, particularly during IGV redemption or value disbursement.

Each entity of the set of entities participating in the fence network—such as merchants, service providers, or affiliated partners—is granted authorized membership status following a validation or onboarding process. This status includes credentials or identifiers that are registered with the network and associated with permissioned access to certain IGV-related transactions. To protect privacy and prevent tampering, information related to this authorized membership—such as entity identifiers, certification references, or permission timestamps—is stored in encrypted form on the blockchain ledger. The encryption ensures that sensitive business or compliance data is protected from unauthorized access, while still being available for on-chain verification.

The validation of such encrypted membership data during smart contract execution is performed via a decentralized consensus mechanism, ensuring that no single entity can manipulate or misrepresent membership status. In this embodiment, the decentralized consensus mechanism comprises a Proof-of-Authority (PoA) validation process. PoA is a blockchain consensus model in which trusted and pre-approved validators—often known entities with reputational stakes—are responsible for verifying transactions and approving changes to the ledger.

During IGV-related transactions that involve fence network members, the smart contract responsible for executing the transaction interacts with this PoA-based validation layer. The smart contract queries the blockchain ledger to retrieve the encrypted membership data of the involved entity, decrypts it using approved logic or shared keys, and then cross-references it with consensus-approved validators to confirm whether the entity holds valid and current membership in the fence network. If the verification fails—such as in cases where the entity's membership has expired, been revoked, or was never granted—the smart contract halts execution and rejects the transaction.

The use of PoA validation offers multiple technical benefits in this context. First, it enables fast and energy-efficient consensus, as validators do not need to perform computationally expensive proof-of-work calculations. Second, it ensures that only authorized and reputational accountable entities can participate in validating transactions. Third, it provides resilience against malicious actors by enforcing collective agreement among approved authorities.

This layered approach—combining encrypted on-chain membership data with smart contract logic and PoA-based decentralized consensus—enables the system to tightly control who can redeem IGVs within a fence network. It enforces compliance, enhances auditability, and eliminates the need for off-chain checks, thereby offering a trustless, secure, and policy-driven voucher redemption infrastructure in a decentralized environment.

In an embodiment, the present invention is implemented as a system (not illustrated in figures) for secure transaction processing of an Industry Gift Voucher (IGV) in a blockchain network, the system being configured to perform the operations described in aforesaid embodiments that at least correspond to the method (1900) for secure transaction processing of the IGV in the blockchain network. The system comprises a plurality of hardware and software components that collaboratively facilitate the secure issuance, assignment, and ownership tracking of IGVs through a decentralized and verifiable infrastructure.

The system includes a plurality of blockchain nodes, each comprising a processor, memory, communication interface, and optionally, persistent storage. The processor is a computing unit capable of executing machine-readable instructions stored in the memory. These instructions include logic for receiving IGV transaction requests, transforming and hashing data, storing records on the blockchain ledger, and interacting with smart contracts. The memory may be any suitable non-transitory medium, such as RAM, ROM, or flash storage, used to store both program code and temporary execution data.

At least one of the blockchain nodes operates as a transaction-processing node, which receives a request to obtain ownership of an IGV from a terminal device associated with a first entity. The terminal device may be a mobile phone, a point-of-sale system, a computer terminal, or any user interface device capable of submitting data to the blockchain node. This request includes unidentified data related to the first entity—such as an anonymous identifier, encrypted user profile, or wallet address—and data related to the IGV, including voucher metadata.

The processor of the blockchain node is configured to identify at least one attribute of the IGV and information associated with the first entity based on the received request. These attributes may include the IGV's base value, expiration date, creation timestamp, transaction identifier, and more.

Once the relevant attributes and entity data are identified, the processor transforms this information into a first concatenated data string, which serves as the input for generating a first cryptographic hash value. The system executes a cryptographic hashing algorithm—such as SHA-256—through the processor to generate a unique and tamper-proof digital fingerprint of the IGV and its ownership linkage. The generated hash is designed to be collision-resistant to ensure each IGV is uniquely identifiable on the blockchain.

The processor then writes the first cryptographic hash value, along with the IGV's attribute data and identified first entity information, to a blockchain ledger. The blockchain ledger is distributed across the plurality of blockchain nodes and serves as an immutable and decentralized repository for recording IGV transactions.

To finalize the ownership assignment, the system executes a first smart contract, also stored on the blockchain ledger. The smart contract is configured to validate the authenticity of the generated hash value by retrieving it from the ledger and comparing it against expected values derived from the associated IGV and first entity data. Upon successful validation, the smart contract updates the ownership information of the IGV in real time and records this change on the blockchain ledger. Because of the immutable nature of the ledger, the updated ownership record is tamper-proof and verifiable across all nodes in the network.

The communication interface of each blockchain node allows it to interact with other nodes and terminal devices via network protocols, including TCP/IP, HTTP/S, or blockchain-specific peer-to-peer protocols. Terminal devices involved in the transaction may also include display modules or user interface elements that present ownership confirmation or transaction summaries to the end user.

This system offers several technical advantages over traditional, centralized voucher management platforms. By distributing the verification and record-keeping responsibilities across multiple nodes, the present invention ensures high fault tolerance, data integrity, and resilience to single points of failure. Further, by incorporating smart contracts and cryptographic techniques, the system enables automated, transparent, and secure ownership management of IGVs, thereby addressing critical challenges such as fraud, unauthorized access, and trust dependency in voucher ecosystems.

In an embodiment, the present invention is also implemented as a non-transitory computer-readable medium (CRM) having stored thereon a set of machine-readable instructions which, when executed by at least one processor of a blockchain node in a blockchain network, cause the processor to perform the steps described in the aforesaid embodiments that at least correspond to the method (1900) for secure transaction processing of the IGV in the blockchain network. This embodiment facilitates deployment of the invention in the form of software logic that can be executed across distributed computing environments.

The computer-readable medium may include any non-transitory storage medium, such as magnetic storage devices (e.g., hard disks), optical storage devices (e.g., CDs, DVDs), flash memory, solid-state drives, or non-volatile memory chips embedded in servers or client devices. The instructions stored on the CRM define a complete transaction-handling module for secure IGV issuance, ownership assignment, and verification within a blockchain environment.

When executed by a processor of a blockchain node, the instructions cause the system to first receive a request to obtain ownership of an Industry Gift Voucher (IGV) from a terminal device associated with a first entity. The terminal device may be a user-operated computing device such as a smartphone, POS terminal, or computer, and the request includes data related to the IGV and unidentified data related to the requesting entity.

Next, the processor is instructed to identify one or more attributes of the IGV and the first entity based on the data received. These attributes may include, for example, the IGV's base value, expiration date, timestamp, transaction ID, or any other data element uniquely defining the voucher.

The instructions further enable the processor to transform the identified IGV and entity-related data into a concatenated data string, which is then passed to a cryptographic hash function, such as SHA-256, to generate a first cryptographic hash value. This hash value uniquely identifies the IGV and the request context, and is designed to be collision-resistant to ensure the uniqueness and traceability of the voucher.

Subsequently, the processor executes additional instructions to store the generated hash value, along with the IGV attributes and first entity data, on the blockchain ledger distributed across a plurality of blockchain nodes. The blockchain ledger provides an immutable and decentralized database that ensures integrity and auditability of all transactions.

To assign ownership of the IGV to the first entity, the machine-readable instructions invoke a first smart contract, stored on the blockchain ledger. This smart contract is programmed to validate the authenticity of the cryptographic hash value by acquiring it from the ledger and comparing it to reconstructed data inputs. If the validation is successful, the smart contract records the new ownership information in real time on the blockchain ledger. Due to the immutable nature of the ledger, the recorded ownership assignment is permanent, verifiable, and resistant to tampering or unauthorized modification.

The CRM instructions may also include logic to interact with terminal devices, enabling the presentation of ownership confirmation messages, transaction receipts, or visual representations of the voucher after successful assignment.

By implementing the invention in the form of a non-transitory computer-readable medium, the system provides scalability and portability, allowing the software to be installed and run across different types of blockchain environments and computing architectures. Furthermore, the CRM-based implementation ensures that the core logic of secure IGV transaction processing can be updated, deployed, and maintained independently of the hardware platform.

This embodiment further reinforces the invention's ability to provide a decentralized, secure, and transparent solution for managing Industry Gift Vouchers, delivering robust protection against fraudulent activity, unauthorized access, and data tampering, while enabling automated and verifiable ownership tracking.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for secure transaction processing of an Industry Gift Voucher (IGV) in a blockchain network, comprising:

receiving, via a processor of a blockchain node of a plurality of blockchain nodes, a request for obtaining ownership of the IGV from a terminal device associated to a first entity of a plurality of entities, wherein the request includes unidentified data related to the first entity and data related to the IGV;

identifying, via the processor, at least one of a set of attributes of the IGV from the data related to the IGV, and the unidentified data related to the first entity, based on the receiving the request for obtaining the ownership of the IGV;

transforming, via the processor, at least one of data related to the set of attributes of the IGV and identified data related to the first entity to a first concatenated data string, based on the identifying the at least one of the set of attributes of the IGV and the unidentified data related to the first entity;

generating, via the processor, a first cryptographic hash value for the IGV, based on the first concatenated data string and execution of at least a set of machine-readable instructions, wherein the generating the first cryptographic hash value is further based on execution of a hashing algorithm that corresponds to a SHA-256 algorithm, the first cryptographic hash value is collision resistant and has a hierarchical structure that corresponds to a Merkle tree structure, verification of the data related to the IGV is optimized through the Merkle tree structure, and the first cryptographic hash value, the data related to the set of attributes of the IGV, and the identified data related to the first entity are stored on a blockchain ledger that is distributed over the plurality of blockchain nodes;

verifying, via the processor, whether the generated first cryptographic hash value is unique, and re-generating, via the processor, a new cryptographic hash value that is unique when the generated first cryptographic hash value is verified as a duplicate hash value;

assigning, via the processor, the ownership of the IGV to the first entity, based on the generating the first cryptographic hash value and executing a first smart contract of a plurality of smart contracts, wherein the plurality of smart contracts is stored on the blockchain ledger, the first smart contract, when executed, validates authenticity of the first cryptographic hash value by acquiring the first cryptographic hash value from the blockchain ledger and comparing, subsequently, the first cryptographic hash value with at least one of the data related to the set of attributes of the IGV and the identified data related to the first entity, the first smart contract, in real-time, records ownership information of the IGV on the blockchain ledger after the assigning the ownership of the IGV to the first entity, and the ownership information of the IGV recorded on the blockchain ledger is immutable and verified through the first cryptographic hash value, and execution of the first smart contract of the plurality of smart contracts is validated via a decentralized consensus mechanism that comprises a Proof-of-Authority (PoA) validation process performed by pre-approved validators across the plurality of blockchain nodes.

2. The method of claim 1 further comprising:

receiving, via the processor, a gift request of the IGV from the first entity via the terminal device, wherein the gift request corresponds to transfer of the ownership of the IGV from the first entity to a second entity of the plurality of entities;

transforming, via the processor, at least one of the first cryptographic hash value and data related to the second entity to a second concatenated data string, based on the receiving the gift request;

generating, via the processor, a second cryptographic hash value for the IGV, based on the second concatenated data string and execution of the at least the set of machine-readable instructions, wherein the second cryptographic hash value and the data related to the second entity are stored on the blockchain ledger; and transferring, via the processor, the ownership of the IGV, from the first entity to the second entity, based on the receiving the gift request, the generating the second cryptographic hash value, and executing a second smart contract of the plurality of smart contracts, wherein the second smart contract, when executed, validates authenticity of the second cryptographic hash value by acquiring the second cryptographic hash value from the blockchain ledger and comparing, subsequently, the second cryptographic hash value with at least one of the first cryptographic hash value, the data related to the set of attributes of the IGV, the data related to the first entity, or the data related to the second entity, and the second smart contract, in real-time, updates the ownership information on the blockchain ledger after the transferring the ownership of the IGV to the second entity.

3. The method of claim 2 further comprising:

transmitting, via the processor, in real-time, transaction information to the terminal device, wherein the transaction information corresponds to change in the ownership information of the IGV that is stored on the blockchain ledger; and control, via the processor, the terminal device to display, via a display device, the change in the ownership information of the IGV.

4. The method of claim 2, wherein the generating the second cryptographic hash value is further based on execution of at least a hashing algorithm that corresponds to a SHA-256 algorithm, the second cryptographic hash value is collision resistant and has a hierarchical structure, the hierarchical structure of the second cryptographic hash value corresponds to a Merkle tree structure, and verification of the data related to the IGV is optimized through the Merkle tree structure.

5. The method of claim 1 further comprising:

receiving, via the processor, a redemption request of the IGV from the first entity via the terminal device to redeem the IGV with a third entity of a set of entities, wherein the set of entities of the plurality of entities is associated to a fence network, and data related to the set of entities is stored on the blockchain ledger;

transforming, via the processor, at least one of the first cryptographic hash value and data related to the third entity to a third concatenated data string, based on the receiving the redemption request;

generating, via the processor, a third cryptographic hash value for the IGV, based on the third concatenated data string and execution of the at least the set of machine-readable instructions, wherein the third cryptographic hash value is stored on the blockchain ledger; and transferring, via the processor, the ownership of the IGV, from the first entity to the third entity, based on the receiving the redemption request, the generating the third cryptographic hash value, and executing a third smart contract of the plurality of smart contracts, wherein the third smart contract, when executed, verifies whether the IGV is previously redeemed and whether the third entity is associated to the fence network by mapping data related to the third entity with the data related to the set of entities stored on the blockchain ledger, the third smart contract, subsequent to verification of the third entity associated to the fence network, validates authenticity of the third cryptographic hash value by acquiring the third cryptographic hash value from the blockchain ledger and comparing, subsequently, the third cryptographic hash value with at least one of the first cryptographic hash value, the data related to the set of attributes of the IGV, the data related to the first entity, or the data related to the third entity, and the third smart contract, in real-time, updates the ownership information on the blockchain ledger and marks the IGV as redeemed after the transferring the ownership of the IGV to the third entity.

6. The method of claim 5, wherein the IGV comprises a predetermined incentive in a blockchain network based collateral account, and the predetermined incentive is transferred, via at least one smart contract of the plurality of smart contracts, to the third entity when the IGV is redeemed.

7. The method of claim 5, wherein the generating the third cryptographic hash value is further based on execution of at least a hashing algorithm that corresponds to a SHA-256 algorithm, the third cryptographic hash value is collision resistant and has a hierarchical structure, the hierarchical structure of the third cryptographic hash value corresponds to a Merkle tree structure, and verification of the data related to the IGV is optimized through the Merkle tree structure.

8. The method of claim 1 further comprising:

verifying, via the processor, whether generated first cryptographic hash value is unique; and re-generating, via the processor, a new cryptographic hash value, that is unique, when the generated first cryptographic hash value is verified as duplicate hash value.

9. The method of claim 1, wherein the data related to the set of attributes of the IGV comprises at least one of a base value, expiration data, creation timestamp, unique transaction identifier, or previous hash.

10. The method of claim 1, wherein data related to at least one entity of the plurality of entities comprises at least one of corresponding entity details, entity's account information, or entity's proof of licenses or certifications on the blockchain ledger.

11. The method of claim 1, wherein the generating the first cryptographic hash value is further based on execution of at least a hashing algorithm that corresponds to a SHA-256 algorithm, the first cryptographic hash value is collision resistant and has a hierarchical structure, and the ownership information is validated through the first cryptographic hash value.

12. The method of claim 11, wherein the hierarchical structure of the first cryptographic hash value corresponds to a Merkle tree structure, and verification of the data related to the IGV is optimized through the Merkle tree structure.

13. The method of claim 1, wherein the IGV is utilized for a commodity from at least one entity of a set of entities, and the set of entities of the plurality of entities is associated with a fence network.

14. The method of claim 13, wherein each entity of the set of entities associated to the fence network has an authorized membership of the fence network, information related to the authorized membership of each of the entity of the set of entities is stored on the blockchain ledger in an encrypted form, the plurality of smart contracts validates the information related to the authorized membership of each of the entity via a decentralized consensus mechanism, and the decentralized consensus mechanism comprises a Proof-of-Authority (PoA) validation process.

15. The method of claim 1, wherein each smart contract of the plurality of smart contracts executes a respective transaction of a plurality of transactions in the blockchain network, each of the smart contract prior to executing the respective transaction authenticates a multi-signature approval received from a set of entities of the plurality of entities associated to the respective transaction, the multi-signature approval corresponds to an approval received via signature from each of the set of entities associated to the respective transaction, and the plurality of transactions corresponds to at least one of the assigning the ownership of the IGV or transferring the ownership of the IGV.

16. The method of claim 1, wherein each smart contract of the plurality of smart contracts executes a respective transaction of a plurality of transactions in the blockchain network, and execution of each of the smart contract of the plurality of smart contracts validates timestamp and detects whether the respective transaction of the plurality of transactions is fraudulent.

17. A system for secure transaction processing of an Industry Gift Voucher (IGV) in a blockchain network, comprising:

a plurality of blockchain nodes, wherein each blockchain node of the plurality of blockchain nodes comprises a processor configured to:

receive a request for obtaining ownership of the IGV from a terminal device associated to a first entity of a plurality of entities, wherein the request includes unidentified data related to the first entity and data related to the IGV, and the terminal device is communicatively coupled to the processor;

identify at least one of a set of attributes of the IGV from the data related to the IGV, and the unidentified data related to the first entity, based on receipt of the request for obtaining the ownership of the IGV;

transform at least one of data related to the set of attributes of the IGV and identified data related to the first entity to a first concatenated data string, based on identification of the at least one of the set of attributes of the IGV and the unidentified data related to the first entity;

generate a first cryptographic hash value for the IGV, based on the first concatenated data string and execution of at least a set of machine-readable instructions, wherein the generation of the first cryptographic hash value is further based on execution of a hashing algorithm that corresponds to a SHA-256 algorithm, the first cryptographic hash value is collision resistant and has a hierarchical structure that corresponds to a Merkle tree structure, verification of the data related to the IGV is optimized through the Merkle tree structure, and the first cryptographic hash value, the data related to the set of attributes of the IGV, and the identified data related to the first entity are stored on a blockchain ledger that is distributed over the plurality of blockchain nodes;

verify whether the generated first cryptographic hash value is unique, and re-generate a new cryptographic hash value that is unique when the generated first cryptographic hash value is verified as a duplicate hash value;

assign the ownership of the IGV to the first entity, based on generation of the first cryptographic hash value and execution of a first smart contract of a plurality of smart contracts, wherein the plurality of smart contracts is stored on the blockchain ledger, the first smart contract, when executed, validates authenticity of the first cryptographic hash value by acquiring the first cryptographic hash value from the blockchain ledger and comparing, subsequently, the first cryptographic hash value with the at least one of the data related to the set of attributes of the IGV and the identified data related to the first entity, the first smart contract, in real-time, records ownership information of the IGV on the blockchain ledger after assignment of the ownership of the IGV to the first entity, and the ownership information of the IGV recorded on the blockchain ledger is immutable and verified through the first cryptographic hash value, and execution of the first smart contract of the plurality of smart contracts is validated via a decentralized consensus mechanism that comprises a Proof-of-Authority (PoA) validation process performed by pre-approved validators across the plurality of blockchain nodes.

18. The system of claim 17, wherein the processor is further configured to:

receive a gift request of the IGV from the first entity via the terminal device, wherein the gift request corresponds to transfer of the ownership of the IGV from the first entity to a second entity of the plurality of entities;

transform at least one of the first cryptographic hash value and data related to the second entity to a second concatenated data string, based on receipt of the gift request;

generate a second cryptographic hash value for the IGV, based on the second concatenated data string and execution of the at least the set of machine-readable instructions, wherein the second cryptographic hash value and the data related to the second entity are stored on the blockchain ledger; and transfer the ownership of the IGV, from the first entity to the second entity, based on the receipt of the gift request, generation of the second cryptographic hash value, and execution of a second smart contract of the plurality of smart contracts, wherein the second smart contract, when executed, validates authenticity of the second cryptographic hash value by acquiring the second cryptographic hash value from the blockchain ledger and comparing, subsequently, the second cryptographic hash value with at least one of the first cryptographic hash value, the data related to the set of attributes of the IGV, the data related to the first entity, or the data related to the second entity, and the second smart contract, in real-time, updates the ownership information on the blockchain ledger after the transferring the ownership of the IGV to the second entity.

19. The system of claim 17, wherein the processor is further configured to:

receive a redemption request of the IGV from the first entity via the terminal device to redeem the IGV with a third entity of a set of entities, wherein the set of entities of the plurality of entities is associated to a fence network, and data related to the set of entities is stored on the blockchain ledger;

transform at least one of the first cryptographic hash value and data related to the third entity to a third concatenated data string, based on receipt of the redemption request;

generate a third cryptographic hash value for the IGV, based on the third concatenated data string and execution of the at least the set of machine-readable instructions, wherein the third cryptographic hash value is stored on the blockchain ledger; and transfer the ownership of the IGV, from the first entity to the third entity, based on the receipt of the redemption request, generation of the third cryptographic hash value, and execution of a third smart contract of the plurality of smart contracts, wherein the third smart contract, when executed, verifies whether the IGV is previously redeemed and whether the third entity is associated to the fence network by mapping data related to the third entity with the data related to the set of entities stored on the blockchain ledger, the third smart contract, subsequent to verification of the third entity associated to the fence network, validates authenticity of the third cryptographic hash value by acquiring the third cryptographic hash value from the blockchain ledger and comparing, subsequently, the third cryptographic hash value with at least one of the first cryptographic hash value, the data related to the set of attributes of the IGV, the data related to the first entity, or the data related to the third entity, and the third smart contract, in real-time, updates the ownership information on the blockchain ledger and marks the IGV as redeemed after the transferring the ownership of the IGV to the third entity.

20. A non-transitory computer readable medium for secure transaction processing of an Industry Gift Voucher (IGV) in a blockchain network having stored thereon computer-executable instructions that, when executed by a processor of a blockchain node of a plurality of blockchain nodes, cause the processor to execute operations, the operations comprising:

receiving a request for obtaining ownership of the IGV from a terminal device associated to a first entity of a plurality of entities, wherein the request includes unidentified data related to the first entity and data related to the IGV;

identifying at least one of a set of attributes of the IGV from the data related to the IGV, and the unidentified data related to the first entity, based on the receiving the request for obtaining the ownership of the IGV;

transforming at least one of data related to the set of attributes of the IGV and identified data related to the first entity to a first concatenated data string, based on the identifying the at least one of the set of attributes of the IGV and the unidentified data related to the first entity;

generating a first cryptographic hash value for the IGV, based on the first concatenated data string and execution of at least a set of machine-readable instructions, wherein the generating the first cryptographic hash value is further based on execution of a hashing algorithm that corresponds to a SHA-256 algorithm, the first cryptographic hash value is collision resistant and has a hierarchical structure that corresponds to a Merkle tree structure, verification of the data related to the IGV is optimized through the Merkle tree structure, and the first cryptographic hash value, the data related to the set of attributes of the IGV, and the identified data related to the first entity are stored on a blockchain ledger that is distributed over the plurality of blockchain nodes;

verifying whether the generated first cryptographic hash value is unique, and re-generating a new cryptographic hash value that is unique when the generated first cryptographic hash value is verified as a duplicate hash value;

assigning the ownership of the IGV to the first entity, based on the generating the first cryptographic hash value and executing a first smart contract of a plurality of smart contracts, wherein the plurality of smart contracts is stored on the blockchain ledger, the first smart contract, when executed, validates authenticity of the first cryptographic hash value by acquiring the first cryptographic hash value from the blockchain ledger and comparing, subsequently, the first cryptographic hash value with the at least one of the data related to the set of attributes of the IGV and the identified data related to the first entity, the first smart contract, in real-time, records ownership information of the IGV on the blockchain ledger after the assigning the ownership of the IGV to the first entity, and the ownership information of the IGV recorded on the blockchain ledger is immutable and verified through the first cryptographic hash value, and execution of the first smart contract of the plurality of smart contracts is validated via a decentralized consensus mechanism that comprises a Proof-of-Authority (PoA) validation process performed by pre-approved validators across the plurality of blockchain nodes.

* * * * *